United States Patent
Nakagawa et al.

(10) Patent No.: US 7,079,728 B2
(45) Date of Patent: Jul. 18, 2006

(54) WAVELENGTH MULTIPLEXING PROCESSING APPARATUS

(75) Inventors: Goji Nakagawa, Kawasaki (JP); Hideyuki Miyata, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 92 days.

(21) Appl. No.: 10/747,292

(22) Filed: Dec. 30, 2003

(65) Prior Publication Data

US 2004/0165817 A1    Aug. 26, 2004

(30) Foreign Application Priority Data

Feb. 20, 2003    (JP) ............................. 2003-042474

(51) Int. Cl.
*G02B 6/12* (2006.01)
*H04J 14/02* (2006.01)

(52) U.S. Cl. ............................. 385/37; 385/24; 385/14; 385/130; 385/131; 385/132; 398/82; 398/84; 398/87

(58) Field of Classification Search ............... 385/11, 385/14, 15–17, 24, 29, 33, 36, 37, 46, 129–132, 385/88, 89, 92; 398/82, 83, 84, 85, 87, 88
See application file for complete search history.

(56) References Cited

U.S. PATENT DOCUMENTS

| | | | |
|---|---|---|---|
| 5,960,133 A |  | 9/1999 | Tomlinson .................... 385/18 |
| 6,263,127 B1 | * | 7/2001 | Dragone et al. .............. 385/24 |
| 6,304,687 B1 | * | 10/2001 | Inoue et al. .................. 385/14 |
| 6,337,760 B1 | * | 1/2002 | Huibers et al. ............. 359/291 |
| 2004/0252938 A1 | * | 12/2004 | Ducellier et al. ............. 385/27 |

FOREIGN PATENT DOCUMENTS

| | | |
|---|---|---|
| JP | 11-95051 | 4/1999 |
| JP | 2000-347065 | 12/2000 |

* cited by examiner

*Primary Examiner*—Brian M. Healy

(57) ABSTRACT

A wavelength multiplexing processing apparatus for use with a wavelength division multiplexing system is disclosed which uses a single AWG to achieve reduction in cost, size and loss. The wavelength multiplexing processing apparatus includes a waveguide device wherein a plurality of incoming and outgoing waveguides, a first slab waveguide and a plurality of channel waveguides are formed on a substrate, a mirror array device and a lens device. The plane direction angles of reflecting mirrors which reflect optical signal components incoming thereto are set so that reflected light of an optical signal component incoming from one of the plural incoming and outgoing waveguides may go out from one of the plural incoming and outgoing waveguides.

16 Claims, 10 Drawing Sheets

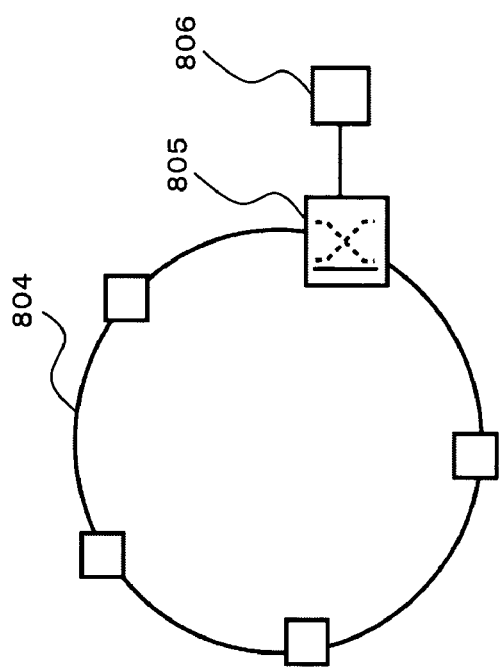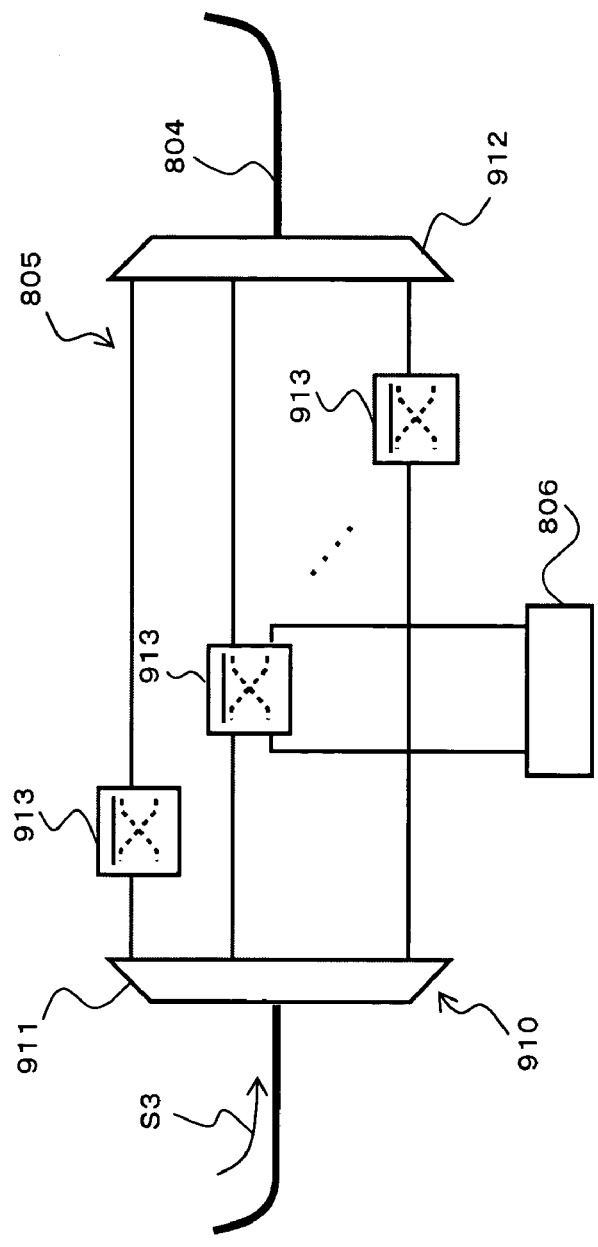
FIG. 8(a)
FIG. 8(b)

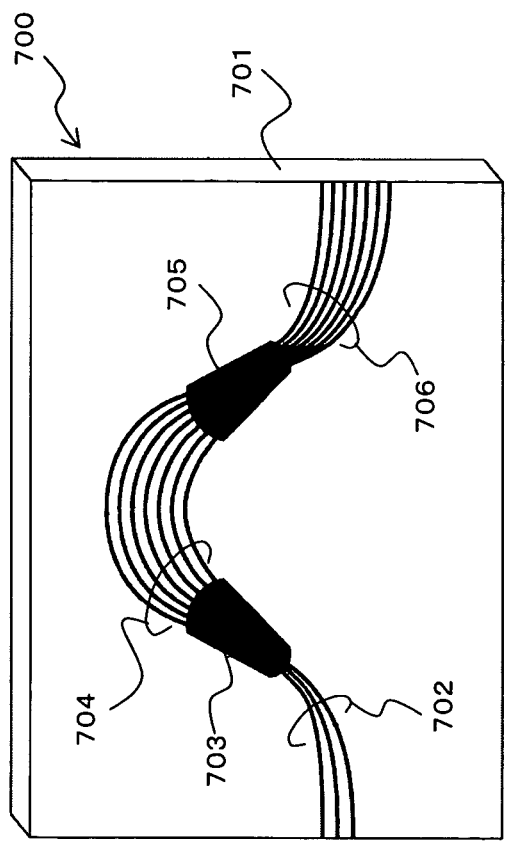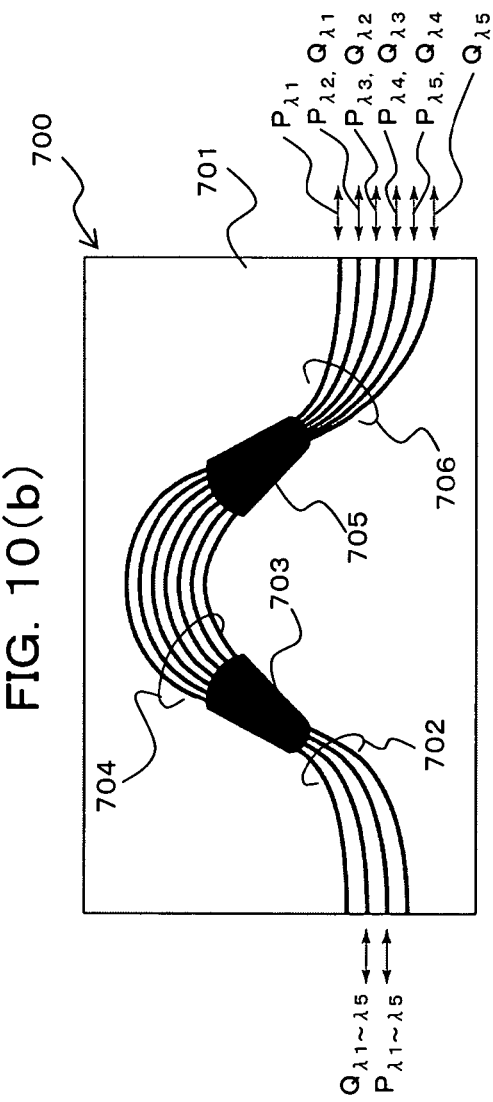

WAVELENGTH MULTIPLEXING PROCESSING APPARATUS

BACKGROUND OF THE INVENTION

1) Field of the Invention

This invention relates to a wavelength multiplexing processing apparatus for use with a wavelength division multiplexing (WDM) system, and more particularly to a wavelength multiplexing processing apparatus which includes a combination of a waveguide optical system and a spatial optical system.

2) Description of the Related Art

The IP (Internet Protocol) network continues a worldwide high growth on the background of the increase in number of subscribers and the development of applications in the Internet. The demand for a transmission network which is an infrastructure of the IP network is increasing explosively. This tendency is exhibited conspicuously particularly in the North America of the IT (Information Technology) advanced countries, and communication undertakers progressively increase the investment in WDM (Wavelength Division Multiplexing) transmission systems and hasten the construction of optical networks which use the WDM transmission systems.

Examples of a network configuration of a WDM transmission system are shown in FIGS. 7(a), 7(b), 8(a) and 8(b). Referring first to FIG. 7(a), a plurality of ring networks are connected to each other (only two rings 801 and 802 are shown in FIG. 7(a)). A transmission apparatus 803 serving as a connection section between the rings 801 and 802 includes, as a wavelength multiplexing processing apparatus, for example, such a cross connect apparatus 900 for exchanging (that is, for cross connecting) optical signals of arbitrary wavelengths as shown in FIG. 7(b).

In particular, the cross connect apparatus 900 can exchange optical signals of arbitrary wavelengths for each other and includes, as shown in FIG. 7(b), multiplexing-demultiplexing processing sections 901 to 904 for performing a wavelength demultiplexing process for wavelength multiplexed optical signals propagating in the rings 801 and 802 and optical switches 905 for switchably outputting the wavelength demultiplexed optical signals of the different wavelengths from the rings 801 and 802 to the ring 801 or the ring 802.

For example, a wavelength multiplexed optical signal S1 circulating in the counterclockwise direction in FIG. 7(a) in the ring 801 and inputted to the transmission apparatus 803 is wavelength demultiplexed by the multiplexing-demultiplexing processing section 901 whereas another wavelength multiplexed optical signal S2 circulating in the clockwise direction in FIG. 7(a) in the ring 802 and inputted to the transmission apparatus 803 is wavelength demultiplexed by the multiplexing-demultiplexing processing section 902, and the output destination rings of the optical signals of the different wavelengths are switched by the optical switches 905. The output destination rings of the optical switches 905 can be set arbitrarily for the individual wavelengths.

It is to be noted that an optical signal to be outputted from any of the optical switches 905 to the ring 801 is wavelength multiplexed with the optical signals of the wavelengths by the multiplexing-demultiplexing processing section 903 and then signaled from the transmission apparatus 803 while an optical signal to be outputted from any of the optical switches 905 to the ring 802 is wavelength multiplexed with the optical signals of the other wavelengths by the multiplexing-demultiplexing processing section 904 and then signaled from the transmission apparatus 803.

FIG. 8(a) shows another configuration example of a network of a WDM transmission system. Referring to FIG. 8(a), an apparatus 806 is locally connected to a ring network 804 through a transmission apparatus 805. The apparatus 806 can extract an arbitrary wavelength signal propagating in the ring network 804 and simultaneously can place another optical signal of the same wavelength into the ring network 804 through an optical add-drop multiplexer 910 (FIG. 8(b)) provided in the transmission apparatus 805 and serving as a wavelength multiplexing processing apparatus.

FIG. 8(b) shows the optical add-drop multiplexer (OADM) 910 of the transmission apparatus 805. Referring to FIG. 8(b), theoptical add-drop multiplexer 910 includes multiplexing-demultiplexing processing sections 911 and 912 for performing a wavelength demultiplexing process for wavelength multiplexed optical signals propagating in the ring network 804 and optical switches 913 capable of switchably outputting the wavelength demultiplexed optical signals of the different wavelengths from the ring network 804 to the ring network 804 or the apparatus 806.

For example, a wavelength multiplexed optical signal S3 circulating in the counterclockwise direction in FIG. 8 in the ring network 804 and inputted to the optical add-drop multiplexer 910 is wavelength demultiplexed by the multiplexing-demultiplexing processing section 911, and the output destinations of the resulting optical signals of the different wavelengths are switched to the ring network 804 or the apparatus 806 by the optical switches 913. The optical switches 913 can set the output destinations arbitrarily for the individual wavelengths.

Incidentally, as the cross connect apparatus 900 or the optical add-drop multiplexer 910 described hereinabove, such an apparatus as shown in FIG. 9 is conventionally known which is implemented using two arrayed waveguide gratings [AWG, refer to FIGS. 10(a) and 10(b)] (AWR1 and AWR2 in FIG. 9) (refer to Patent Document 1 hereinafter listed). In the apparatus shown in FIG. 9, a wavelength multiplexed optical signal is demultiplexed into a plurality of wavelength demultiplexed optical signals using an AWG and a transmission type planar diffraction grating and reflected by a two-dimensional array of mechanically tiltable micromirror switches 610 to perform optical add and drop.

In particular, optical signals having wavelengths to pass through the apparatus from among wavelength multiplexed lights incoming from an input (IN) port are reflected toward a lens 608 side so that they are outputted to a pass (PASS) port through an optical circulator 601 while optical signals having wavelengths to be dropped are reflected toward another lens 611 side so that they are outputted to a drop (DROP) port through another optical circulator 602. On the other hand, an optical signal to be added from an add (ADD) port is reflected to the lens 608 side so that it is outputted to the pass (PASS) port through the optical circulator 601.

Meanwhile, an apparatus which uses a diffraction grating together with tiltable micromirrors to perform optical add and drop is disclosed in Patent Document 2 hereinafter listed.

It is to be noted that also an apparatus disclosed in Patent Document 3 hereinafter listed is available as an apparatus which relates to the invention of the present application. However, the apparatus disclosed in Patent Document 3 involves neither optical add and drop process nor cross connect process.

[Patent Document 1]

Japanese Patent Laid-open No. 2000-347065

[Patent Document 2]
U.S. Pat. No. 5,960,133
[Patent Document 3]
Japanese Patent Laid-open No. Hei 11-95051

However, the apparatus disclosed in Patent Document 1 has a subject to be solved in that, since it requires two AWGs and two optical circulators, a high cost is required for production of the apparatus and also in that, since it requires a great number of parts, the apparatus has a great size.

Meanwhile, the apparatus disclosed in Patent Document 2 is disadvantageous in that it cannot implement a cross connect function and it is difficult to implement an arrangement which is ready for an increase of the number of wavelengths to be multiplexed.

SUMMARY OF THE INVENTION

It is an object of the present invention to provide a wavelength multiplexing processing apparatus which uses only one AWG for performing wavelength multiplexing and demultiplexing and achieves reduction in cost, size and loss.

In order to attain the object described above, according to the present invention, there is provided a wavelength multiplexing processing apparatus, comprising a waveguide device including a substrate, a plurality of incoming and outgoing waveguides formed on the substrate each for allowing an optical signal to come in or go out therethrough, a first slab waveguide formed on the substrate and connected to the plural incoming and outgoing waveguides, and a plurality of channel waveguides of different lengths from each other formed on the substrate and connected to the first slab circuit, a mirror array device including at least one mirror array wherein a reflecting mirror whose angle in a plane direction can be changed is disposed corresponding to each of light paths of the incoming lights, and a lens device for condensing, when a wavelength-multiplexed optical signal is introduced into the plural incoming and outgoing waveguides, optical signal components outgoing from the plural channel waveguides for the individual optical signal components having different light paths so that the condensed optical signal components go out to the corresponding reflecting mirrors of the mirror array device and for introducing reflected light from the reflecting mirrors to an end face of the substrate adjacent the channel waveguides, the plane direction angles of the reflecting mirrors which reflect the incoming optical signal components being set so that reflected light of an optical signal component incoming from one of the plural incoming and outgoing waveguides may go out from one of the plural incoming and outgoing waveguides.

The wavelength multiplexing processing apparatus may be configured such that the mirror array device includes a plurality of mirror arrays and the respective mirrors of the plural mirror arrays cooperate to set the plane direction angles so that reflected light of an optical signal component incoming from one of the plural incoming and outgoing waveguides may go out from one of the plural incoming and outgoing waveguides, and the lens device includes a waveguide side lens disposed at a focal position of the optical signal components going out from the plural channel waveguides.

The wavelength multiplexing processing apparatus may be configured such that the mirror array device includes a single mirror array, and the lens device includes a waveguide side lens disposed at a focal position of the optical signal components going out from the plural channel waveguides and a lens array including a plurality of reflecting mirror side lenses disposed in a corresponding relationship to the reflecting mirrors of the mirror array.

The plane direction angles of the reflecting mirrors by which the incoming optical signal components are reflected may be set so as to perform a cross connection process of the optical signal components incoming from the plural incoming and outgoing waveguides.

Or, the plane direction angles of the reflecting mirrors by which the incoming optical signal components are reflected may be set so as to perform a light branching and inserting process of a light signal component incoming from one of the plural incoming and outgoing waveguides through one of the waveguides other than the waveguide from which the optical signal component comes in.

The wavelength multiplexing processing apparatus may be configured such that the waveguide device further includes a second slab waveguide formed on the substrate and connected to the plural channel waveguides, and the second slab waveguide is formed on the end face of the substrate adjacent the channel waveguides into which the reflected light from the reflecting mirrors comes.

In this instance, the second slab waveguide may have a wavelength length smaller than that of the first slab waveguide.

The plural channel waveguides may have ends disposed on a straight line.

The wavelength multiplexing processing apparatus may be configured such that the plural incoming and outgoing waveguides formed on the substrate of the waveguide device include a first incoming and outgoing waveguide and a second incoming and outgoing waveguide, and a first input port and a first output are connected to the first incoming and outgoing waveguide through a first optical circulator while a second input port and a second output port are connected to the second incoming and outgoing waveguide through a second optical circulator.

The wavelength multiplexing processing apparatus may be configured such that the plural incoming and outgoing waveguides formed on the substrate of the waveguide device include first and second incoming and outgoing waveguides into which the optical signals come and third and fourth incoming and outgoing waveguides from which the optical signals go out, and a first input port is connected to the first incoming and outgoing waveguide and a second input port is connected to the second incoming and outgoing waveguide while a first output port is connected to the third incoming and outgoing waveguide and a second output port is connected to the fourth incoming and outgoing waveguide.

In this instance, the four first to fourth incoming and outgoing waveguides may be arranged in order of the first incoming and outgoing waveguide, second incoming and outgoing waveguide, third incoming and outgoing waveguide and fourth incoming and outgoing waveguide relative to one another.

The wavelength multiplexing processing apparatus described above may be configured such that the first input port serves as an input port for a light inserting and branching process and the second input port serves as an insertion port for the light inserting and branching process while the first output serves as an output port for the light inserting and branching process and the second output port serves as a branching port for the light inserting and branching process.

The wavelength multiplexing processing apparatus maybe configured such that the mirror array device includes a first mirror array and a second mirror array, and the first mirror array is optically connected to the lens device and is disposed such that an optical axis thereof to the second mirror array is directed so as not to overlap at least with optical axes of the plural channel waveguides while the second mirror array is disposed so as to reflect incoming light from the first mirror array back to the first mirror array.

With the wavelength multiplexing processing apparatus of the present invention, an optical cross connect function and/or an optical drop and/or add function can be implemented using a single waveguide device. Consequently, there is an advantage that the number of parts for configuring the apparatus can be reduced to reduce the production cost significantly and miniaturization of the apparatus scale can be anticipated.

The above and other objects, features and advantages of the present invention will become apparent from the following description and the appended claims, taken in conjunction with the accompanying drawings in which like parts or elements denoted by like reference characters.

BRIEF DESCRIPTION OF THE DRAWINGS

FIGS. 8(*a*) and 8(*b*) are diagrammatic views showing another example of a network configuration of a WDM transmission system;

FIG. 10(*a*) is a top plan view schematically showing a configuration of an AWG and FIG. 10(*b*) is a top plan view schematically showing the AWG of FIG. 10(*a*) and particularly illustrating a wavelength demultiplexing characteristic.

DESCRIPTION OF THE PREFERRED EMBODIMENTS

[A] AWG (Arrayed Waveguide Grating)

Figure 1:
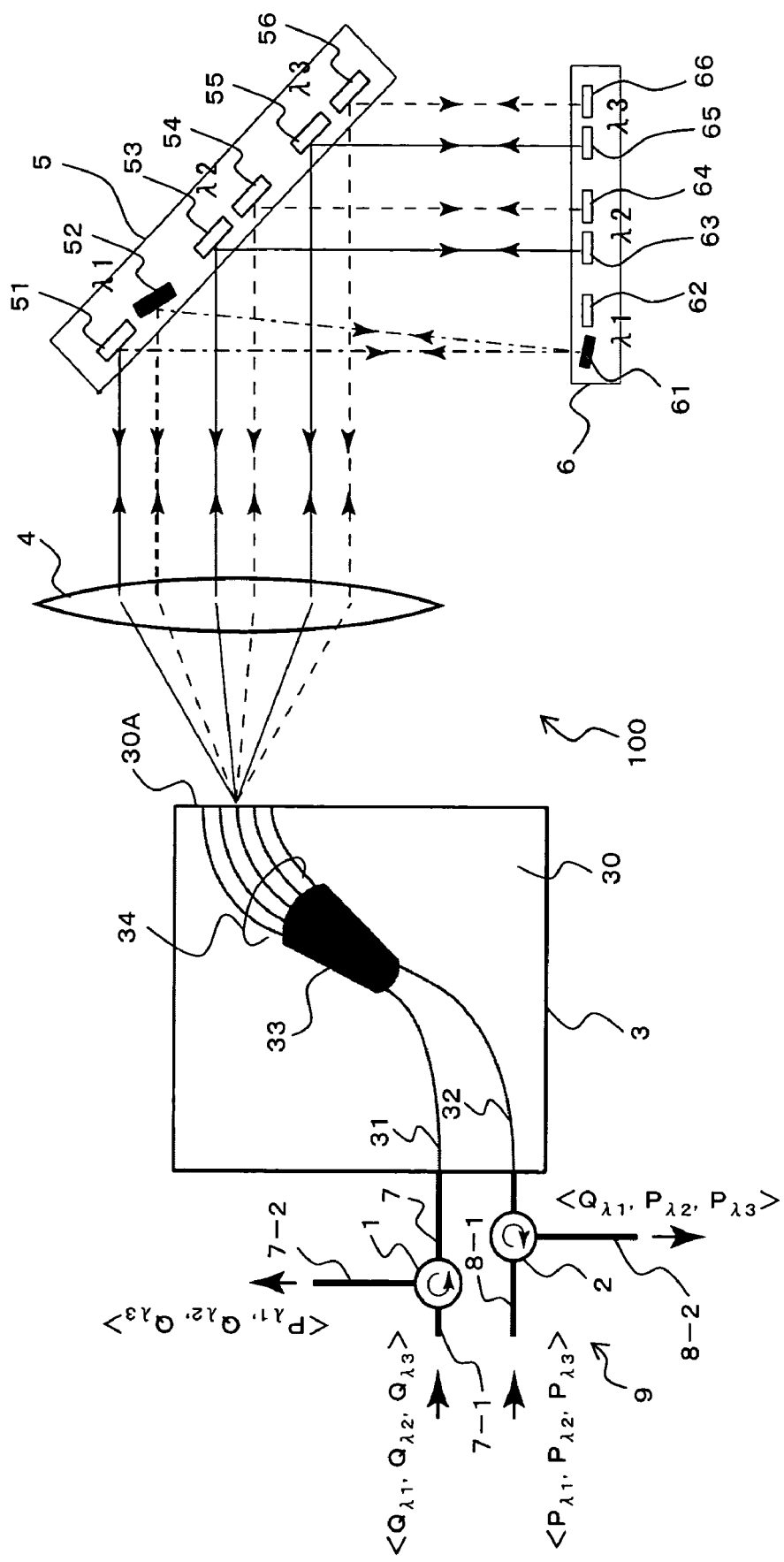
FIG. 1 is a schematic view showing a wavelength multiplexing processing apparatus according to a first embodiment of the present invention.

In the following, a commonly known configuration of an AWG is described in order to facilitate understanding of a configuration of a wavelength multiplexing processing apparatus of each of several embodiments of the present invention.

FIG. 10(*a*) is a top plan view schematically showing a configuration of an AWG and FIG. 10(*b*) is a top plan view schematically showing the AWG of FIG. 10(*a*) and particularly illustrating a wavelength demultiplexing characteristic.

A common AWG 700 shown in FIG. 10(*a*) includes at least one [four in FIG. 10(*a*)] input waveguide 702, an input side slab waveguide 703, a plurality of channel waveguides 704, an output side slab waveguide 705 and a plurality of output waveguides 706 formed on a substrate 701. If wavelength multiplexed lights (for example, wavelength multiplexed lights having wavelengths λ1 to λ3) are inputted from the outside to one of the input waveguides 702 through an optical fiber or a like element, then they are wavelength demultiplexed and outputted from different ones of the output waveguides 706 from one another.

The input side slab waveguide 703 diffuses light having propagated from the input waveguides 702 by diffraction. The channel waveguides 704 have different waveguide lengths from one another and are successively arranged based on the waveguide lengths. The channel waveguides 704 propagate the lights diffused by the input side slab waveguide 703 such that the lights propagating therein are provided with phase differences thereamong.

The output side slab waveguide 705 causes radiated lights from the channel waveguides 704 to interfere with each other and condenses them at focal positions in the proximity of connection portions thereof to the output waveguides 706. The focal positions in the proximity of the connection portions to the output waveguides 706 are such that, when wavelength multiplexed lights are inputted from one of the input waveguides 702, lights of same wavelength components are condensed at different focal positions.

In other words, since the position at which light is condensed differs depending upon the wavelength due to a phase difference caused by a difference in length between different channel waveguides 704, if wavelength multiplexed lights are inputted from the input waveguides 702, then they are outputted individually from different ones of the output waveguides 706 (that is, spectralized). Consequently, the output waveguides 706 can propagate lights of mutually different wavelengths condensed by the output side slab waveguide 705 described above.

It is to be noted that, if the port to which wavelength multiplexed lights are to be inputted (the input waveguide 702 from which wavelength multiplexed lights are to be inputted) is displaced by one port distance as seen in FIG. 10(*b*), then also the spectralized lights are displaced by one port distance. In particular, those of the output waveguides 706 from which the lights of the individual wavelengths are to be outputted are displaced by one port distance. This is because, since the incoming angles of the lights of the wavelengths to the channel waveguides 704 are displaced by one port distance, also the phase matching angles are displaced by an angle corresponding to one port distance also on the output side due to the displacement in angle.

For example, if wavelength multiplexed lights (Pλ1 to Pλ5) are inputted from the third input waveguide 702 from above in FIG. 10(*b*), then the wavelength demultiplexed lights Pλ1 to Pλ5 are outputted from the first to fifth output waveguides 706 from above in FIG. 10(*b*), respectively. However, if wavelength multiplexed lights (Qλ1 to Qλ5) are inputted from the second input waveguide 702 from above in FIG. 10(*b*), then the wavelength demultiplexed lights Qλ1 to Qλ5 are outputted from the second to sixth output waveguides 706 (at displaced port positions) from above in FIG. 10(*b*), respectively.

The AWG 700 can wavelength demultiplex wavelength multiplexed lights multiplexed in such a manner as described above. Further, when signal lights of different wavelengths are inputted from the output waveguides 706 on the opposite side, the AWG 700 can output wavelength multiplexed lights to the input waveguides 702.

In this instance, if the output waveguides 706 as ports from which the wavelength demultiplexed lights are to be inputted are displaced by one port distance, then also the input waveguide 702 from which the wavelength multiplexed lights are to be outputted is displaced by one port distance. In other words, also the port position of the input waveguide 702 from which the wavelength multiplexed light is to be outputted is displaced by one port distance depending upon the output port positions to which the wavelength demultiplexed lights are inputted.

For example, if wavelength demultiplexed lights Pλ1 to Pλ5 are inputted from the first to fifth output waveguides 706 from above in FIG. 10(*b*), respectively, then the wavelength multiplexed lights (Pλ1 to Pλ5) are outputted from the third input waveguide 702 from above in FIG. 10(*b*). However, if the wavelength demultiplexed lights Qλ1 to Qλ5 are inputted from the second to sixth output waveguides 706 from above in FIG. 10(*b*), respectively, then the wavelength multiplexed lights (Qλ1 to Qλ5) are outputted from the second input waveguide 702 (at a displaced port position) from above in FIG. 10(*b*).

[B] First Embodiment

FIG. 1 is a schematic view showing a wavelength multiplexing processing apparatus according to a first embodiment of the present invention. Referring to FIG. 1, the wavelength multiplexing processing apparatus 100 shown performs a cross connect process for wavelength multiplexed lights from two optical fibers 7-1 and 8-1 serving as input ports (first and second input ports) and outputs resulting lights from two optical fibers 7-2 and 8-2 serving as output ports (first and second output ports).

The wavelength multiplexing processing apparatus 100 shown in FIG. 1 further includes an input/output optical interface section 9 which in turn includes a pair of optical circulators 1 and 2 and optical fibers 7, 7-1, 7-2, 8, 8-1 and 8-2, an AWG 3 as a waveguide device, a lens 4, and a pair of mirror arrays 5 and 6.

The AWG 3 shown in FIG. 1 is equivalent to a device produced by cutting the substrate 701 of the AWG 700 [refer to FIGS. 10(*a*) and 10(*b*)] having two input waveguides 702 such that the channel waveguides 704 are cut apart vertically along an end face of the substrate 701.

In particular, the AWG 3 includes incoming/outgoing waveguides 31 and 32, a (first) slab waveguide 33 and a plurality of [five in FIG. 1] channel waveguides 34, which are basically similar to those [refer to reference numerals 702 to 704] shown in FIGS. 10(*a*) and 10(*b*) formed continuously and integrally on a substrate 30. In other words, the incoming/outgoing waveguides 31 and 32 to or from which optical signals are inputted or outputted, the (first) slab waveguide 33 connected to the incoming/outgoing waveguides 31 and 32 and the plural channel waveguides 34 connected to the slab waveguide 33 and having lengths different from one another are formed on the substrate 30.

The channel waveguides 34 are vertically cut apart at a channel waveguide formation end face 30A such that the ends of the channel waveguides 34 are juxtaposed on a straight line. Consequently, the loss at the optical coupling between the channel waveguides 34 and the lens 4 is low.

It is to be noted that, in FIG. 1, optical signals (wavelength multiplexed lights) from the optical fiber 7-1 as a first input port are inputted to the incoming/outgoing waveguide 31 of the AWG 3. On the other hand, optical signals (wavelength multiplexed lights) after a cross connect process are outputted from the AWG 3 toward the optical fiber 7-2 as a first output port. Thus, the incoming/outgoing waveguide 31 is connected to the optical fibers 7-1 and 7-2 as first input/output ports through the optical fiber 7 and the optical circulator (first circulator) 1.

On the other hand, optical signals (wavelength multiplexed lights) are inputted from the optical fiber 8-1 as a second input port to the incoming/outgoing waveguide 32. Meanwhile, optical signals (wavelength multiplexed lights) after a cross connect process are outputted from the AWG 3 toward the optical fiber 8-2 as a second output port. Thus, the incoming/outgoing waveguide 32 is connected to the optical fibers 8-1 and 8-2 as second input/output ports through the optical fiber 8 and the optical circulator (second circulator) 2.

Further, in the AWG 3 in the first embodiment, wavelength multiplexed lights from the incoming/outgoing waveguides 31 and 32 are diffused by the slab waveguide 33 and provided with phase differences corresponding to the waveguide lengths by the channel waveguides 34. The lights provided with the phase differences in this manner are outputted from the channel waveguide formation end face 30A of the substrate 30 toward the lens 4. In other words, the slab waveguide 33 and the channel waveguides 34 cooperate with each other to spectralize wavelength multiplexed lights to different directions depending upon the wavelengths through diffraction and interference of the wavelength multiplexed lights, and the spectralized lights are emitted from the end face 30A.

Further, in the AWG 3, lights inputted to the channel waveguide formation end face 30A from the lens 4 at the succeeding stage are outputted as wavelength multiplexed lights after a cross connect process from the incoming/outgoing waveguides 31 and 32 toward the optical fibers 7-2 and 8-2 serving as output ports.

The lens (waveguide side lens) 4 is disposed at focal positions of optical signal components emitted from the plural channel waveguides 34. The lens 4 condenses lights outputted from the channel waveguide formation end face 30A at focal positions different from one another depending upon different wavelengths and outputs the lights of the wavelengths as parallel lights having different optical paths from one another to the mirror array 5 at the following stage.

Further, the lens 4 outputs reflected lights from the mirror arrays 5 and 6 at the following stages toward the channel waveguide formation end face 30A. Accordingly, the channel waveguide formation end face 30A of the AWG 3 and the lens 4 are optically connected to each other in the incoming and outgoing directions, and the channel waveguide formation end face 30A and the lens 4 cooperatively have functions similar to those of the output side slab waveguide 705 described hereinabove with reference to FIGS. 10(*a*) and 10(*b*).

The mirror array (first mirror array) 5 is disposed such that it is optically connected to the lens 4 and optical axes thereof with the second mirror array 6 are directed so as not to overlap with the optical axes of the plural channel waveguides 34. The second mirror array 6 is disposed such that incoming lights from the first mirror array 5 are reflected back to the first mirror array 5.

Each of the mirror arrays 5 and 6 which form a mirror array device includes reflecting mirrors (sometimes referred to simply as mirrors) 51 to 56 or 61 to 66 disposed corresponding to the optical paths of the incoming lights such that the angles thereof in a plane direction can be changed, and reflects parallel lights from the lens 4 back to the lens 4.

Particularly, the mirrors 51 to 56 and 61 to 66 are arranged in accordance with the number of wavelengths of wavelength multiplexed lights to be inputted and outputted and the number of incoming/outgoing waveguides 31 and 32, and parallel lights having different optical paths from one another are reflected by the different mirrors 51 to 56 or 61 to 66 from one another. In the mirror arrays 5 and 6 in the present embodiment, six mirrors 51 to 56 and six mirrors 61 to 66 are arranged, respectively, based on the number of wavelengths to be multiplexed (three wavelengths) and the number of incoming/outgoing waveguides 31 and 32 (two input/output waveguides).

In other words, the lens 4 described above functions as a lens device which condenses, when wavelength multiplexed optical signals are inputted to the plural incoming/outgoing waveguides 31 and 32, optical signal components outputted from the channel waveguides 34 for the individual optical signal components having different optical paths from one another and outputs the optical signal components to the corresponding mirrors 51 to 56 and 61 to 66 of the mirror arrays 5 and 6 and then introduces reflected lights from the mirrors of the mirror arrays 5 and 6 into the end face 30A of the channel waveguides 34.

Further, while the mirrors 51 to 56 and 61 to 66 reflect optical signal components inputted to the incoming/outgoing waveguides 31 and 32, reflected lights originating from the input lights are outputted from one of the incoming/outgoing waveguides 31 and 32 through an optical cross connect process depending upon switching setting of the angles in a plane direction of the mirrors 51 to 56 and 61 to 66.

In particular, the reflecting mirrors 51 to 56 and 61 to 66 of the mirror arrays cooperatively set the angles in a plane direction in order to set the waveguide from which reflected lights originating from optical signal components inputted from one of the incoming/outgoing waveguides 31 and 32 are to be outputted to one of the incoming/outgoing waveguides 31 and 32.

The mirror 51 receives a demultiplexed light P$\lambda$1 of a wavelength $\lambda$1 from the optical fiber 8-1 as a parallel light from the lens 4 and reflects the demultiplexed light P$\lambda$1 toward the mirror 61 or 62 of the mirror array 6 side by switching of the angle thereof in a plane direction. The mirror 52 receives a demultiplexed light Q$\lambda$1 of the wavelength $\lambda$1 from the optical fiber 7-1 as a parallel light from the lens 4 and reflects the demultiplexed light Q$\lambda$1 toward the mirror 61 or 62 on the mirror array 6 side by switching of the angle thereof in a plane direction.

The angles of the mirrors 61 and 62 in a plane direction are switched through cooperation thereof with the mirrors 51 and 52 so that the mirrors 61 and 62 reflect lights inputted thereto from the mirrors 51 and 52 so as to pass the same optical paths or output reflected lights so as to exchange the optical paths for each other toward the lens 4.

It is to be noted that, in FIG. 1, the angles of the mirrors 51 and 52 in a plane direction are switched so that the demodulated light P$\lambda$1 is reflected toward the mirror 61 by the mirror 51 while the demodulated light Q$\lambda$1 is reflected toward the mirror 61 by the mirror 52. Further, the angle of the mirror 61 in a plane direction is switched so that the demodulated light P$\lambda$1 and the demodulated light Q$\lambda$1 from the mirrors 51 and 52 are reflected toward the mirrors 52 and 51, respectively, by the mirror 61.

Meanwhile, the demodulated light P$\lambda$1 from the mirror 61 reflected by the mirror 52 is outputted toward the lens 4 along an optical path along which it is to be outputted to the optical fiber 7-2 through the AWG 3, and the demodulated light Q$\lambda$1 from the mirror 62 reflected by the mirror 51 is outputted toward the lens 4 along another optical path along which it is to be outputted to the optical fiber 8-2 through the AWG 3.

Further, the mirror 53 receives the demultiplexed light P$\lambda$2 of the wavelength $\lambda$2 from the optical fiber 8-1 as a parallel light from the lens 4 and reflects the demultiplexed light P$\lambda$2 toward the mirror 63 or 64 of the mirror array 6 side by switching of the angle thereof in a plane direction. The mirror 54 receives the demultiplexed light Q$\lambda$2 of the wavelength $\lambda$2 from the optical fiber 7-1 as a parallel light from the lens 4 and reflects the demultiplexed light Q$\lambda$2 toward the mirror 63 or 64 of the mirror array 6 side.

The angles of the mirrors 63 and 64 in a plane direction are switched through cooperation thereof with the mirrors 53 and 54 so that the mirrors 63 and 64 reflect lights inputted thereto from the mirrors 53 and 54 so as to pass the same optical paths or output reflected lights so as to exchange the optical paths for each other toward the lens 4.

It is to be noted that, in FIG. 1, the angles of the mirrors 53 and 54 in a plane direction are switched so that the demodulated light P$\lambda$2 is reflected toward the mirror 63 by the mirror 53 while the demodulated light Q$\lambda$2 is reflected toward the mirror 64 by the mirror 54.

Further, the angles of the mirrors 63 and 64 in a plane direction are switched so that they reflect the demodulated light P$\lambda$2 and the demodulated light Q$\lambda$2 from the mirrors 53 and 54 toward the lens 4 side along the original optical paths of them. In particular, the demodulated light P$\lambda$2 reflected by the mirror 63 is outputted toward the lens 4 along an optical path along which it is to be outputted to the optical fiber 8-2 through the AWG 3. Meanwhile, the demodulated light Q$\lambda$2 reflected by the mirror 64 is outputted toward the lens 4 along another optical path along which it is to be outputted to the optical fiber 7-2 through the AWG 3.

Further, the mirror 55 receives a demultiplexed light P$\lambda$3 of a wavelength $\lambda$3 from the optical fiber 8-1 as a parallel light from the lens 4 and reflects the demultiplexed light P$\lambda$3 toward the mirror 65 or 66 of the mirror array 6 side by switching of the angle thereof in a plane direction. The mirror 56 receives a demultiplexed light Q$\lambda$3 of the wavelength $\lambda$3 from the optical fiber 7-1 as a parallel light from the lens 4 and reflects the demultiplexed light Q$\lambda$3 toward the mirror 65 or 66 of the mirror array 6 side.

The angles of the mirrors 65 and 66 in a plane direction are switched through cooperation thereof with the mirrors 55 and 56 so that the mirrors 65 and 66 reflect lights inputted thereto from the mirrors 55 and 56 so as to pass the same optical paths or emit reflected lights so as to exchange the optical paths for each other toward the lens 4.

It is to be noted that, in FIG. 1, the angles of the mirrors 55 and 56 in a plane direction are switched so that the demodulated light P$\lambda$3 is reflected toward the mirror 65 by the mirror 55 while the demodulated light Q$\lambda$3 is reflected toward the mirror 66 by the mirror 56.

Further, the angles of the mirrors 65 and 66 in a plane direction are switched so that they reflect the demodulated light P$\lambda$3 and the demodulated light Q$\lambda$3 from the mirrors 55 and 56 toward the lens 4 side along the original optical paths of them. In particular, the demodulated light P$\lambda$3 reflected by the mirror 65 is outputted toward the lens 4 along an optical path along which it is to be outputted to the optical fiber 8-2 through the AWG 3. Meanwhile, the demodulated light Q$\lambda$3 reflected by the mirror 66 is outputted toward the lens 4 along another optical path along which it is to be outputted to the optical fiber 7-2 through the AWG 3.

Consequently, the AWG 3 can receive such reflected lights from the lens 4 as described above at the channel waveguide formation end face 30A thereof and wavelength multiplexes the received reflected lights into two sets of wavelength multiplex lights in accordance with the incoming angles of the individual reflected light. Thus, the AWG 3 can output the two sets of wavelength multiplexed lights individually through the incoming/outgoing waveguides 31 and 32.

It is to be noted that the mirror array 6 is disposed at an angle substantially perpendicular to the parallel lights from the lens 4 to the mirror array 5. Consequently, arbitrary light transmission intensity can be formed for each wavelength by changing the angles in a plane direction of the reflecting mirrors 61 to 66 which compose the mirror array 6 to change the optical coupling efficiencies between the AWG 3 and the reflecting mirrors 51 to 56 and 61 to 66.

Operation of the wavelength multiplexing processing apparatus 100 according to the first embodiment of the present invention having the configuration described above is described in detail below.

In particular, wavelength multiplexed lights <Qλ1, Qλ2, Qλ3> [in the following description, optical signal components which compose wavelength multiplexed lights are indicated in <>] from the optical fiber 7-1 are inputted to the incoming/outgoing waveguide 31 which composes the AWG 3 through the optical circulator 1 and the optical fiber 7 while wavelength multiplexed lights <Pλ1, Pλ2, Pλ3> from the optical fiber 8-1 are inputted to the incoming/outgoing waveguide 32 of the AWG 3 through the optical circulator 2 and the optical fiber 8 so as to undergo an optical cross connect process.

The wavelength multiplexing processing apparatus 100 which is composed of the input/output optical interface section 9, AWG 3, lens 4 and mirror arrays 5 and 6 performs a cross connect process for two sets of wavelength multiplexed lights inputted to the incoming/outgoing waveguides 31 and 32 as described above, and outputs, for example, resulting wavelength multiplexed lights <Qλ1, Qλ2, Qλ3> through the incoming/outgoing waveguide 31 and outputs resulting wavelength multiplexed lights <Pλ1, Pλ2, Pλ3> through the incoming/outgoing waveguide 32.

In particular, the wavelength multiplexed lights <Qλ1, Qλ2, Qλ3> inputted to the incoming/outgoing waveguide 31 are demultiplexed by the AWG 3, and the individual wavelength components Qλ1, Qλ2, Qλ3 are reflected by the mirrors 52, 54 and 56, respectively [refer to the optical paths indicated by broken lines in FIG. 1]. At this time, the wavelength components Qλ2 and Qλ3 are outputted from the incoming/outgoing waveguide 31 along the original optical paths through cooperative operation of the mirrors 54, 64 and 56, 66. However, the wavelength component Qλ1 is reflected along another optical path which connects to the optical fiber 8-2 through cooperative operation of the mirrors 52, 61 and 51 [refer to the optical path indicated by an alternate long and short dash line from the mirror 52 to the mirror 51 and then to mirror 61 in FIG. 1].

Meanwhile, the wavelength multiplexed lights <Pλ1, Pλ2, Pλ3> inputted to the incoming/outgoing waveguide 32 are demultiplexed by the AWG 3, and the individual wavelength components Pλ1, Pλ2, Pλ3 are reflected by the mirrors 51, 53 and 55, respectively [refer to the optical paths indicated by broken lines in FIG. 1]. At this time, the wavelength components Pλ2 and Pλ3 are outputted from the incoming/outgoing waveguide 32 along the original optical paths through cooperative operation of the mirrors 53, 63 and 55, 65. However, the wavelength component Pλ1 is reflected along a different optical path which connects to the optical fiber 8-2 through cooperative operation of the mirrors 51, 61 and 52 [refer to the optical path indicated by an alternate long and short dash line from the mirror 51 to the mirror 61 and then to the mirror 52 in FIG. 1].

In particular, in order to exchange signal components of wavelength multiplexed lights for each other by a cross connect process, the angles in a plane direction of the mirrors [51, 52] of the mirror array 5 are switched so that the lights may be directed to only one [61] of the two mirrors allocated to the wavelength of the object of the exchange [in the case of FIG. 1, the wavelength λ1] in the mirror array 6. Further, the direction of the mirror [61] of the mirror 61 is changed so that the reflected light from one of the reflecting mirrors [51, 52] of the mirror array 5 may be directed to the other of the reflecting mirrors [52, 51].

Accordingly, by switching the optical paths for the object wavelength components [Pλ1, Qλ1] by means of the mirror arrays 5 and 6, signal components of inputted wavelength multiplexed lights can be exchanged in a unit of a wavelength and outputted as wavelength multiplexed light for which a cross connect process has been performed from the incoming/outgoing waveguides 31 and 32. This similarly applies to exchange of the wavelength components Pλ2 and Qλ2 or Pλ3 and Qλ3 other than the wavelength components Pλ1 and Qλ1 of the wavelength λ1.

It is to be noted that, while the mirror arrays 5 and 6 reflect signal lights of wavelength components demultiplexed into individual wavelengths and selectively switch the directions of the signal lights in accordance with the individual wavelengths, it is also possible to adjust the reflecting angles of the reflecting mirrors 51 to 56 and 61 to 66 so as to return the reflected lights to the AWG 3 with the light intensities of them attenuated suitably. Where the arrangement just described is employed, a wavelength multiplexing processing apparatus can be configured which has not only a function as a cross connect apparatus but also another function for varying the light transmission intensity for each wavelength.

In this manner, with the wavelength multiplexing processing apparatus according to the first embodiment of the present invention, since an optical cross connect function can be implemented using a single AWG 3, there is an advantage that the number of parts for composing the apparatus can be reduced to reduce the production cost significantly and achieve miniaturization of the apparatus scale.

Further, the first mirror array 5 is disposed such that it is optically connected to the lens 4 and the optical axes thereof with the second mirror array 6 are directed so as not to overlap at least with the optical axes of the plural channel waveguides 34, and the second mirror array 6 is disposed so as to reflect input lights from the first mirror array 5 toward the first mirror array 5. Therefore, by directing the plane direction of the mirror array 6 so as to be inclined to a direction perpendicular to the direction of the waveguide array (the direction in which the channel waveguides 34 are formed at an end portion of the AWG 3) to vary the optical coupling efficiency between the waveguides and the reflecting mirrors, an arbitrary light transmission intensity can be obtained for each wavelength. Consequently, also a function as a wavelength equalizer can be provided.

[B1] First Modification to the First Embodiment

Figure 2:
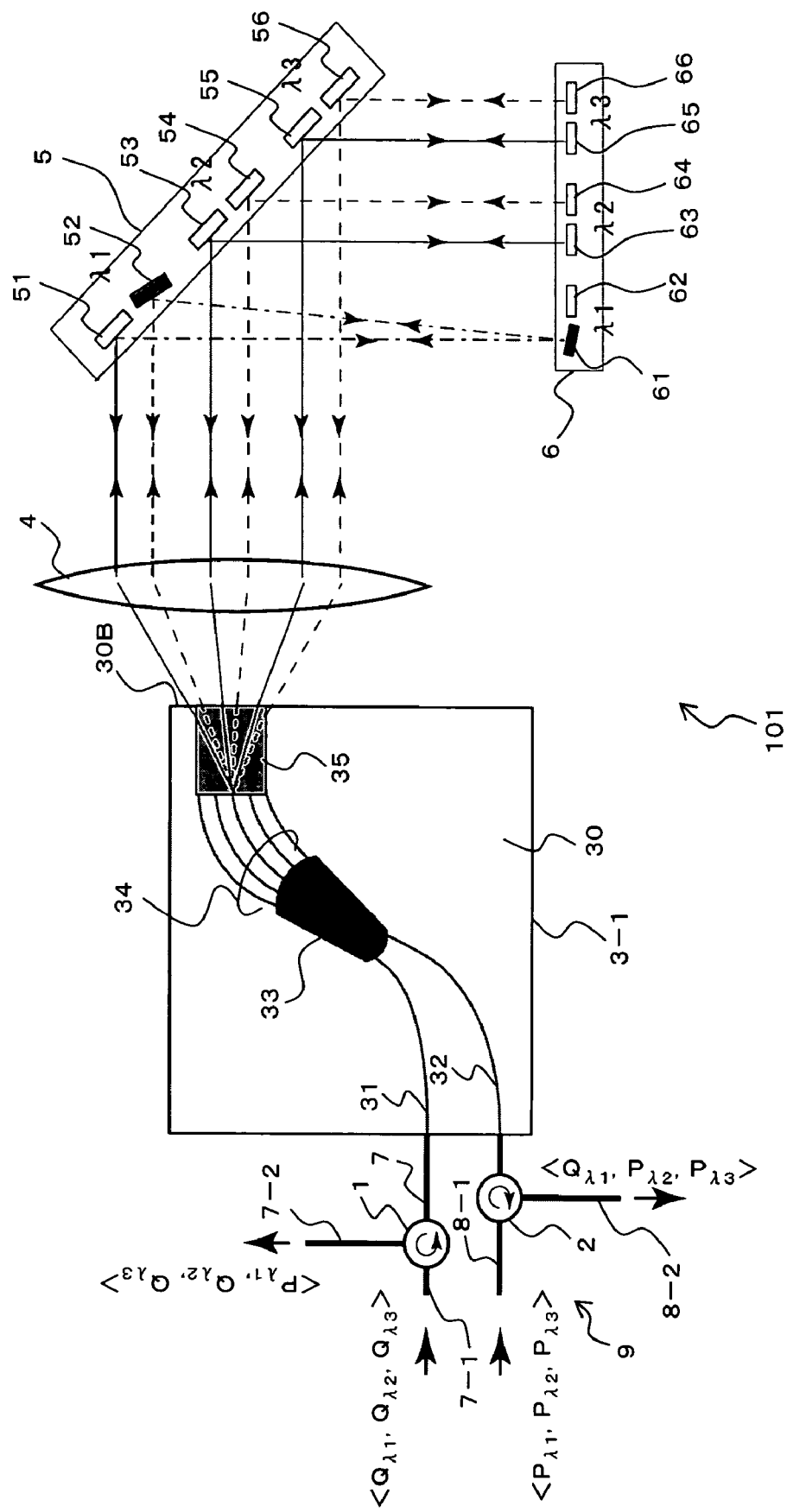
FIG. 2 is a similar view but showing a wavelength multiplexing processing apparatus according to a first modification to the first embodiment of the present invention.

FIG. 2 is a schematic view showing a wavelength multiplexing processing apparatus according to a first modification to the first embodiment of the present invention. Referring to FIG. 2, the wavelength multiplexing processing apparatus 101 shown is different from the wavelength multiplexing processing apparatus 100 of the first embodiment described above in configuration of an AWG 3-1 as a waveguide device. The configuration of the wavelength multiplexing processing apparatus 101 other than the AWG 3-1 is similar to that of the wavelength multiplexing processing apparatus 100 described above, and overlapping description thereof is omitted herein to avoid redundancy.

The AWG 3-1 is different from the AWG 3 shown in FIG. 1 and includes incoming/outgoing waveguides 31 and 32 to or from which optical signals are inputted or outputted, a (first) slab waveguide 33 connected to the incoming/outgoing waveguides 31 and 32 and a plurality of channel waveguides 34 connected to the slab waveguide 33 and having lengths different from one another as well as an output side slab waveguide (second slab waveguide) 35 of a rectangular shape connected to the channel waveguides 34, all formed on a substrate 30.

The output side slab waveguide 35 is formed along an end face 30B optically connected to the lens 4. Consequently, the AWG 3-1 is optically connected to the lens 4 through the formation end face 30B of the output side slab waveguide 35.

Also the wavelength multiplexing processing apparatus 101 according to the first modification to the first embodiment having such a configuration as described above can perform a cross connect process for wavelength multiplexed lights similarly to the wavelength multiplexing processing apparatus 100 according to the first embodiment.

Accordingly, also with the wavelength multiplexing processing apparatus 101 according to the first modification to the first embodiment, advantages similar those of the first embodiment described hereinabove can be achieved. Further, while, in the first embodiment described above, such a high-precision cutting work as to cut the channel waveguides 34 perpendicularly along the end face 30A is required upon production of the AWG 3, with the present modification, since the channel waveguides 34 can be formed only by a high-precision waveguide process, there is an additional advantage in that the channel waveguides 34 can be produced readily with precise lengths.

[B2] Second Modification to the First Embodiment

Figure 3:
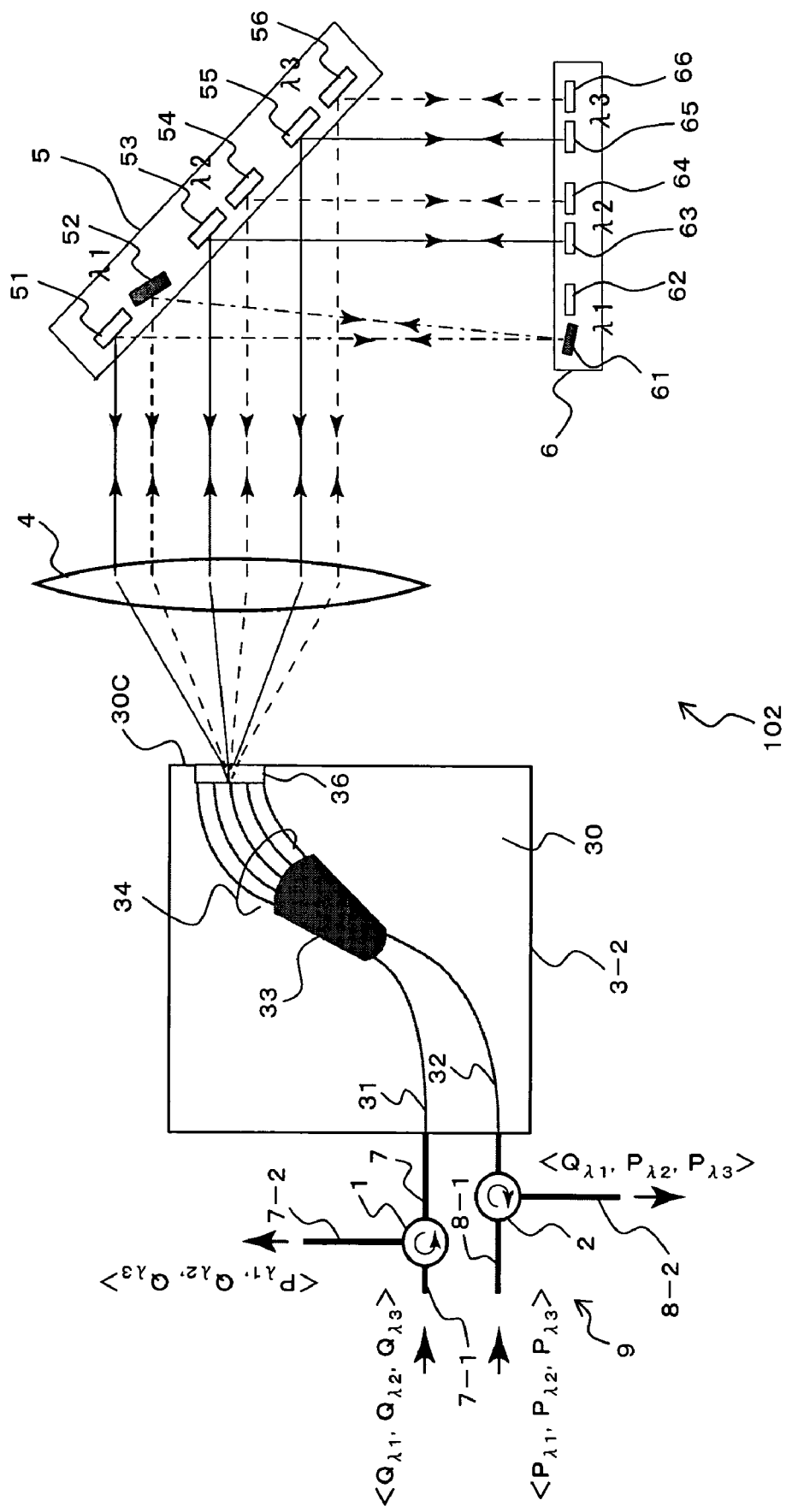
FIG. 3 is a similar view but showing a wavelength multiplexing processing apparatus according to a second modification to the first embodiment of the present invention.

FIG. 3 is a schematic view showing a wavelength multiplexing processing apparatus according to a second modification to the first embodiment of the present invention. Referring to FIG. 3, the wavelength multiplexing processing apparatus 102 shown is different from the wavelength multiplexing processing apparatus 101 described above with reference to FIG. 2 in configuration of an AWG 3-2 as a waveguide device. The configuration of the wavelength multiplexing processing apparatus 102 other than the AWG 3-2 is similar to that of the wavelength multiplexing processing apparatus 100 and 101 described above, and overlapping description thereof is omitted herein to avoid redundancy.

The AWG 3-2 is different from the AWG 3-1 shown in FIG. 2 in that an output side slab waveguide 36 has a length in a light propagation direction shorter than that of the slab waveguide 33. The output side slab waveguide 36 is formed along an end face 30C optically connected to the lens 4 such that the AWG 3-2 is optically connected to the lens 4 through the end face 30C of the output side slab waveguide 35.

Also the wavelength multiplexing processing apparatus 102 according to the second modification to the first embodiment having such a configuration as described above can perform a cross connect process for wavelength multiplexed lights similarly to the wavelength multiplexing processing apparatus 100 according to the first embodiment.

Accordingly, also with the wavelength multiplexing processing apparatus 102 according to the second modification to the first embodiment, advantages similar those of the first modification to the first embodiment described hereinabove can be achieved. Further, since the output side slab waveguide 36 is formed with a length in the light propagation direction smaller than that of the output side slab waveguide 35 in the wavelength multiplexing processing apparatus 101 of FIG. 2, there is an advantage in that reduction in apparatus scale can be anticipated when compared with the wavelength multiplexing processing apparatus shown in FIG. 2.

It is to be noted that, while, in the first embodiment and the first and second modifications to the first embodiment described above, an optical cross connect function and a light transmission intensity variation function for each wavelength are provided, naturally it is also possible to otherwise provide an optical add and drop function in place of the light cross connect function.

[C] Second Embodiment

Figure 4:
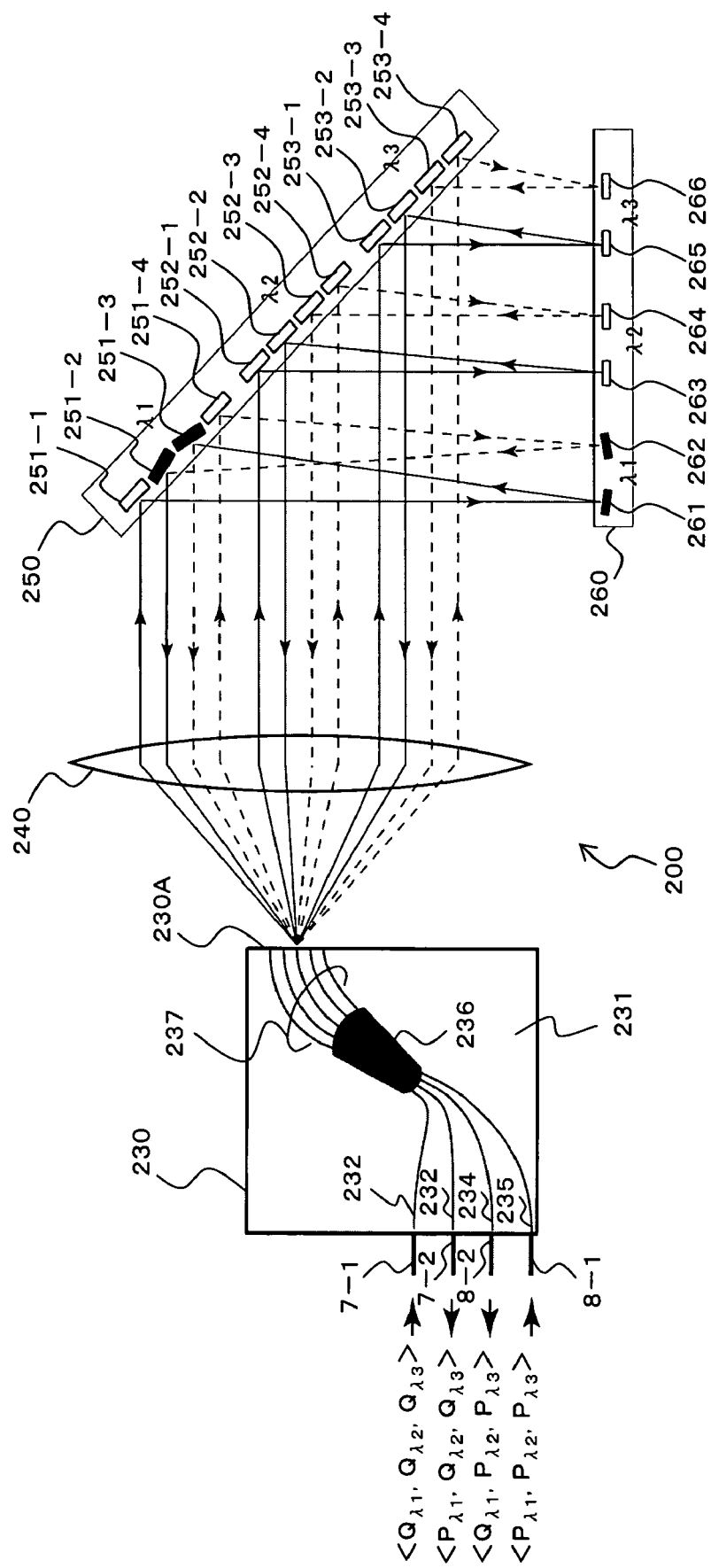
FIG. 4 is a schematic view showing a wavelength multiplexing processing apparatus according to a second embodiment of the present invention.

FIG. 4 is a schematic view showing a wavelength multiplexing processing apparatus according to a second embodiment of the present invention. Referring to FIG. 4, the wavelength multiplexing processing apparatus 200 shown is common to the wavelength multiplexing processing apparatus 100 of the first embodiment described above in that it has a cross connect function and a light transmission intensity variation function for each wavelength. However, the wavelength multiplexing processing apparatus 200 is different from the wavelength multiplexing processing apparatus 100 in configuration of an AWG 230 and mirror arrays 250 and 260 and is further different in that it eliminates optical circulators [refer to reference numerals 1 and 2 in FIG. 1] for interconnecting the optical fibers 7-1, 7-2 and 8-1, 8-2 as input/output ports and the AWG 230.

It is to be noted that a lens 240 of the wavelength multiplexing processing apparatus 200 according to the second embodiment has a function similar to that of the lens 4 described hereinabove with reference to FIGS. 1 to 3.

The AWG 230 includes four incoming/outgoing waveguides 232 to 235, a slab waveguide 236 and a plurality of (five in FIG. 4) channel waveguides 237 formed on a substrate 231 and is equivalent to a device produced by cutting the substrate 701 of the AWG 700 [refer to FIGS. 10(a) and 10(b)] such that the channel waveguides 704 are cut apart vertically along an end face of the substrate 701.

In particular, the incoming/outgoing waveguides 232 to 235 to or from which optical signals are inputted or outputted, the (first) slab waveguide 236 connected to the incoming/outgoing waveguides 232 to 235 and the plural channel waveguides 237 connected to the slab waveguide 236 and having lengths different from one another are formed on the substrate 231. Further, the channel waveguides 237 are vertically cut apart at the channel waveguide formation end face 230A such that the ends of the plural channel waveguides 237 are juxtaposed on a straight line. Consequently, the loss at the optical coupling between the channel waveguides 237 and the lens 4 is low.

While the AWG 230 includes, different from the AWGs 3, 3-1 and 3-2 described hereinabove with reference to FIGS. 1 to 3, the four incoming/outgoing waveguides 232 to 235, the slab waveguide 236 and the channel waveguides 237 are functionally configured similarly to the slab waveguide 33 and the channel waveguides 34 of the AWGs 3, 3-1 and 3-2, respectively. Further, the four incoming/outgoing waveguides 232 to 235 of the AWG 230 are connected to optical fibers 7-1, 7-2 and 8-1, 8-2, respectively.

Consequently, the incoming/outgoing waveguide (first incoming/outgoing waveguide) 232 is formed as an incoming waveguide to which wavelength multiplexed lights are inputted from the optical fiber 7-1 serving as a first input port, and the incoming/outgoing waveguide (second incoming/outgoing waveguide) 235 is formed as an incoming waveguide to which wavelength multiplexed lights are inputted from the optical fiber 8-1 serving as a second input port. Similarly, the incoming/outgoing waveguide (third incoming/outgoing waveguide) 233 is formed as an output waveguide from which first wavelength multiplexed lights after a cross connect process are outputted to the optical fiber 7-2 serving as a first output port, and the incoming/outgoing waveguide (fourth incoming/outgoing waveguide) 234 is formed as an output waveguide from which second wavelength multiplexed lights after the cross connect process are outputted to the optical fiber 8-2 serving as a second output port.

While also the AWG 230 in the second embodiment diffuses wavelength multiplexed lights from the incoming/outgoing waveguide 232 and 235 by means of the slab waveguide 236 and produces phase differences corresponding to the waveguide lengths by means of the channel waveguides 237, the lights to which the phase differences are provided are outputted from the channel waveguide formation end face 230A toward the lens 240. In other words, the slab waveguide 236 and the channel waveguides 237 cooperate with each other to spectralize wavelength multiplexed lights to different directions from one another depending upon the wavelengths through diffraction and interference so that the wavelength multiplexed lights are outputted from the end face 230A.

Further, when reflected lights from the mirror arrays 250 and 260 at the succeeding stage are introduced into the channel waveguide formation end face 230A through the lens 240, the AWG 230 outputs the wavelength multiplexed lights after a cross connect process from the outgoing waveguides 233 and 234 toward the optical fibers 7-2 and 8-2 serving as output ports.

Meanwhile, the lens (waveguide side lens) 240 is disposed at focal positions of optical signal components emitted from the plural channel waveguides 237. The lens 240 condenses lights outputted from the channel waveguide formation end face 230A at focal positions different from one another depending upon different wavelengths and outputs the lights of the wavelengths as parallel lights having different optical paths from one another to the mirror array 250 at the following stage.

Further, the lens 240 outputs reflected lights from the mirror arrays 250 and 260 at the succeeding stages toward the channel waveguide formation end face 230A. Accordingly, the channel waveguide formation end face 230A of the AWG 230 and the lens 240 are optically connected to each other in the incoming and outgoing directions, and the channel waveguide formation end face 230A and the lens 240 have functions similar to those of the output side slab waveguide 705 described hereinabove with reference to FIGS. 10(a) and 10(b).

The mirror array (first mirror array) 250 is disposed such that it is optically connected to the lens 240 and optical axes thereof with the second mirror array 260 are directed so as not to overlap with the optical axes of the plural channel wave guides 237. The second mirror array 260 is disposed such that incoming lights from the first mirror array 250 are reflected back to the first mirror array 250.

Each of the mirror arrays 250 and 260 which form a mirror array device includes reflecting mirrors (sometimes referred to simply as mirrors) 251-1 to 251-4, 252-1 to 252-4 and 253-1 to 253-4 or 261 to 266 disposed corresponding to the optical paths of the incoming lights such that the angles thereof in a plane direction can be changed, and reflects parallel lights from the lens 240 back to the lens 240.

Particularly, the mirrors 251-1 to 253-4 and 261 to 266 are arranged in accordance with the number of wavelengths of wavelength multiplexed lights to be inputted and outputted and the number (four) of incoming/outgoing waveguides 232 to 235, and parallel lights having different optical paths from one another are reflected by the different mirrors from one another.

In the mirror array 250 in the present embodiment, four mirrors 251-1 to 251-4, 252-1 to 252-4 or 253-1 to 253-4 are arranged for each one wave based on the number of wavelengths to be multiplexed (three wavelengths) and the number of incoming/outgoing waveguides 232 to 235 (four input/output waveguides). Meanwhile, in the mirror array 260, two mirrors 261 to 266 are arranged for one wave.

In other words, the lens 240 described above functions as a lens device which condenses, when wavelength multiplexed optical signals are inputted to the plural incoming waveguides 232 and 235, optical signal components outputted from the channel waveguides 237 for the individual optical signal components having different optical paths from one another and outputs the optical signal components to the corresponding mirrors 251-1, 251-4, 252-1, 252-4, 253-1, 253-4 and 261 to 266 of the mirror arrays 250 and 260 and then introduces reflected lights from the reflecting mirrors of the mirror arrays 250 and 260 into the end face 30A of the channel waveguides 237.

Further, while the optical signal components inputted to the incoming waveguides 232 and 235 are reflected by the pertaining mirrors, the angles in a plane direction of the pertaining mirrors 251-1 to 251-4, 252-1 to 252-4 and 253-1 to 253-4 and 261 to 266 then are switchably set so that reflected lights originating from the input lights are outputted from one of the outgoing waveguides 233 or 234 through an optical cross connect process.

In particular, the reflecting mirrors 251-1 to 251-4, 252-1 to 252-4 and 253-1 to 253-4 and 261 to 266 of the mirror arrays 250 and 260 cooperatively set the angles in a plane direction so that reflected lights originating from optical signal components inputted from one of the incoming/outgoing waveguides 232 to 235 may be outputted from one of the incoming/outgoing waveguides 232 to 235.

The mirror 251-1 receives a demultiplexed light P$\lambda$1 of a wavelength $\lambda$1 from the optical fiber 8-1 as a parallel light from the lens 240 and reflects the demultiplexed light P$\lambda$1 toward the mirror 261 of the mirror array 260 side by switching of the angle thereof in a plane direction. The mirror 251-4 receives a demultiplexed light Q$\lambda$1 of the wavelength $\lambda$1 from the optical fiber 7-1 as a parallel light from the lens 240 and reflects the demultiplexed light Q$\lambda$1 toward the mirror 262 on the mirror array 260 side by switching of the angle thereof in a plane direction.

The angles of the mirrors 261 and 262 in a plane direction are switched through cooperation thereof with one of the mirrors 251-2 and 251-3 so that the mirrors 261 and 262 reflect lights inputted thereto from the mirrors 251-1 and 251-4 along an optical path along which they are to output through the optical fiber 8-2 or reflect the lights along another optical path along which they are to output through the optical fiber 7-2.

It is to be noted that, in FIG. 4, the angles of the mirrors 251-1 and 251-2 in a plane direction are switched so that the demodulated light Pλ1 is reflected toward the mirror 261 by the mirror 251-1 while the demodulated light Qλ1 is reflected toward the mirror 262 by the mirror 251-4. Further, the angles of the mirrors 261 and 262 in a plane direction are switched so that the demodulated lights Pλ1 and Qλ1 from the mirrors 251-1 and 251-4 are reflected toward the mirrors 251-3 and 251-2 by the mirrors 261 and 262, respectively.

Meanwhile, the demodulated light Pλ1 from the mirror 261 reflected by the mirror 251-3 is outputted toward the lens 240 along an optical path along which it is to be outputted to the optical fiber 7-2 through the AWG 230, and the demodulated light Qλ1 from the mirror 262 reflected by the mirror 251-2 is outputted toward the lens 240 along another optical path along which it is to be outputted to the optical fiber 8-2 through the AWG 230.

Further, the mirror 252-1 receives the demultiplexed light Pλ2 of the wavelength λ2 from the optical fiber 8-1 as a parallel light from the lens 240 and reflects the demultiplexed light Pλ2 toward the mirror 263 of the mirror array 260 side by switching of the angle thereof in a plane direction. The mirror 252-4 receives the demultiplexed light Qλ2 of the wavelength λ2 from the optical fiber 7-1 as a parallel light from the lens 240 and reflects the demultiplexed light Qλ2 toward the mirror 264 of the mirror array 260 side.

The angles of the mirrors 263 and 264 in a plane direction are switched through cooperation thereof with the mirrors 252-2 and 252-3 so that the mirrors 263 and 264 reflect lights inputted thereto from the mirrors 252-1 and 252-4 along an optical path along which the lights are to be outputted through the optical fiber 8-2 or reflect the lights along another optical path along which the lights are to be outputted through the optical fiber 7-2.

It is to be noted that, in FIG. 4, the angles of the mirrors 252-1 and 252-4 in a plane direction are switched so that the demodulated light Pλ2 is reflected toward the mirror 263 by the mirror 252-1 while the demodulated light Qλ2 is reflected toward the mirror 264 by the mirror 252-4.

Further, the angles of the mirrors 263 and 264 in a plane direction are switched so that the mirrors 263 and 264 reflect the demodulated light Pλ2 and the demodulated light Qλ2 from the mirrors 252-1 and 252-4 toward the lens 240 side along optical paths connecting to the optical fibers 8-2 and 7-2, respectively. In particular, the demodulated light Pλ2 reflected by the mirror 263 is outputted toward the lens 240 along an optical path along which it is to be outputted to the optical fiber 8-2 through the AWG 230. Meanwhile, the demodulated light Qλ2 reflected by the mirror 264 is outputted toward the lens 240 along another optical path along which it is to be outputted to the optical fiber 7-2 through the AWG 230.

Further, the mirror 253-1 receives a demultiplexed light Pλ3 of a wavelength λ3 from the optical fiber 8-1 as a parallel light from the lens 240 and reflects the demultiplexed light Pλ3 toward the mirror 265 of the mirror array 260 side by switching of the angle thereof in a plane direction. The mirror 253-4 receives a demultiplexed light Qλ3 of the wavelength λ3 from the optical fiber 7-1 as a parallel light from the lens 240 and reflects the demultiplexed light Qλ3 toward the mirror 266 of the mirror array 260 side.

The angles of the mirrors 265 and 266 in a plane direction are switched through cooperation thereof with the mirrors 253-2 and 253-3 so that the mirrors 265 and 266 reflect lights inputted thereto from the mirrors 253-1 and 253-4 along an optical path along which the lights are to be outputted through the optical fiber 8-2 or reflect the lights along another optical path along which the lights are to be outputted through the optical fiber 7-2.

It is to be noted that, in FIG. 4, the angles of the mirrors 253-1 and 253-4 in a plane direction are switched so that the demodulated light Pλ3 is reflected toward the mirror 265 by the mirror 253-1 while the demodulated light Qλ3 is reflected toward the mirror 266 by the mirror 253-4.

Further, the angles of the mirrors 265 and 266 in a plane direction are switched so that they reflect the demodulated light Pλ3 and the demodulated light Qλ3 from the mirrors 253-1 and 253-4 toward the lens 240 side along the optical paths connecting to the optical fibers 8-2 and 7-2, respectively. In particular, the demodulated light Pλ3 reflected by the mirror 265 is outputted toward the lens 240 along an optical path along which it is to be outputted to the optical fiber 8-2 through the AWG 230. Meanwhile, the demodulated light Qλ3 reflected by the mirror 266 is outputted toward the lens 240 along another optical path along which it is to be outputted to the optical fiber 7-2 through the AWG 230.

Consequently, the AWG 230 can receive such reflected lights from the lens 240 as described above at the channel waveguide formation end face 230A thereof and wavelength multiplexes the received reflected lights into two sets of wavelength multiplex lights in accordance with the incoming angles of the individual reflected light. Thus, the AWG 230 can output the two sets of wave length multiplexed lights individually through the incoming/outgoing waveguides 233 and 234.

It is to be noted that the mirror array 260 is disposed at an angle substantially perpendicular to the parallel lights from the lens 240 to the mirror array 250. Consequently, arbitrary light transmission intensity can be formed for each wavelength by changing the angles in a plane direction of the reflecting mirrors 261 to 266 which compose the mirror array 260 to change the optical coupling efficiencies between the AWG 230 and the reflecting mirrors 251-1 to 251-4, 252-1 to 252-4 and 253-1 to 253-4 and 261 to 266.

Also the wavelength multiplexing processing apparatus 200 according to the second embodiment of the present invention having the configuration described above can perform a cross connect process basically similarly to the wavelength multiplexing processing apparatus 100 of the first embodiment described hereinabove.

For example, wavelength multiplexed lights <Qλ1, Qλ2, Qλ3> from the optical fiber 7-1 are inputted to the incoming/outgoing waveguide 235 which composes the AWG 230 while wavelength multiplexed lights <Pλ1, Pλ2, Pλ3> from the optical fiber 8-1 are inputted to the incoming/outgoing waveguide 232 of the AWG 3 so as to under go an optical cross connect process.

The wavelength multiplexing processing apparatus 200 which is composed of the AWG 230, lens 240 and mirror arrays 250 and 260 performs a cross connect process for two sets of wavelength multiplexed lights inputted to the incoming/outgoing waveguides 232 and 235 as described above by changing over the angles in a plane direction of the reflecting mirrors 251-1 to 251-4, 252-1 to 252-4 and 253-1 to 253-4 and 261 to 266 which compose the mirror arrays 250 and 260.

Consequently, for example, wavelength multiplexed lights <Pλ1, Qλ2, Qλ3> are outputted through the incoming/outgoing waveguide 233 and wavelength multiplexed lights <Qλ1, Pλ2, Pλ3> are outputted through the incoming/outgoing waveguide 234.

In this manner, with the wavelength multiplexing processing apparatus according to the second embodiment of the present invention, since an optical cross connect function can be implemented using a single AWG 230, there is an advantage that the number of parts for composing the apparatus can be reduced to reduce the production cost significantly and achieve miniaturization of the apparatus scale. Further, since optical circulators which are required by the wavelength multiplexing processing apparatus of the first embodiment can be eliminated, it is possible to further reduce the number of parts thereby to achieve further reduction in production cost and scale and also possible to reduce the optical loss by an amount exhibited when light passes through the optical circulators.

Further, similarly as in the case of the first embodiment described hereinabove, by directing the plane direction of the mirror array 260 so as to be inclined to a direction perpendicular to the direction of the waveguide array to vary the optical coupling efficiency between the waveguides and the reflecting mirrors, an arbitrary light transmission intensity can be obtained for each wavelength, and therefore, a function as a wavelength equalizer can be provided.

Furthermore, the first mirror array 250 is disposed such that it is optically connected to the lens 240 and the optical axes thereof with the second mirror array 260 are directed so as not to overlap at least with the optical axes of the plural channel waveguides 237, and the second mirror array 260 is disposed so as to reflect input lights from the first mirror array 250 toward the first mirror array 5. Thus, in switching of the plane directions of the reflecting mirrors of the mirror arrays 250 and 260, switching of the optical paths is performed after light beams when signal lights demodulated into individual wavelengths are reflected by the switches are directed to a direction perpendicular to the optical path direction between the lens 240 and the mirror array 250. Therefore, introduction of each optical signal to any other port than an output port of the switching destination can be prevented.

[D] Third Embodiment

Figure 5:
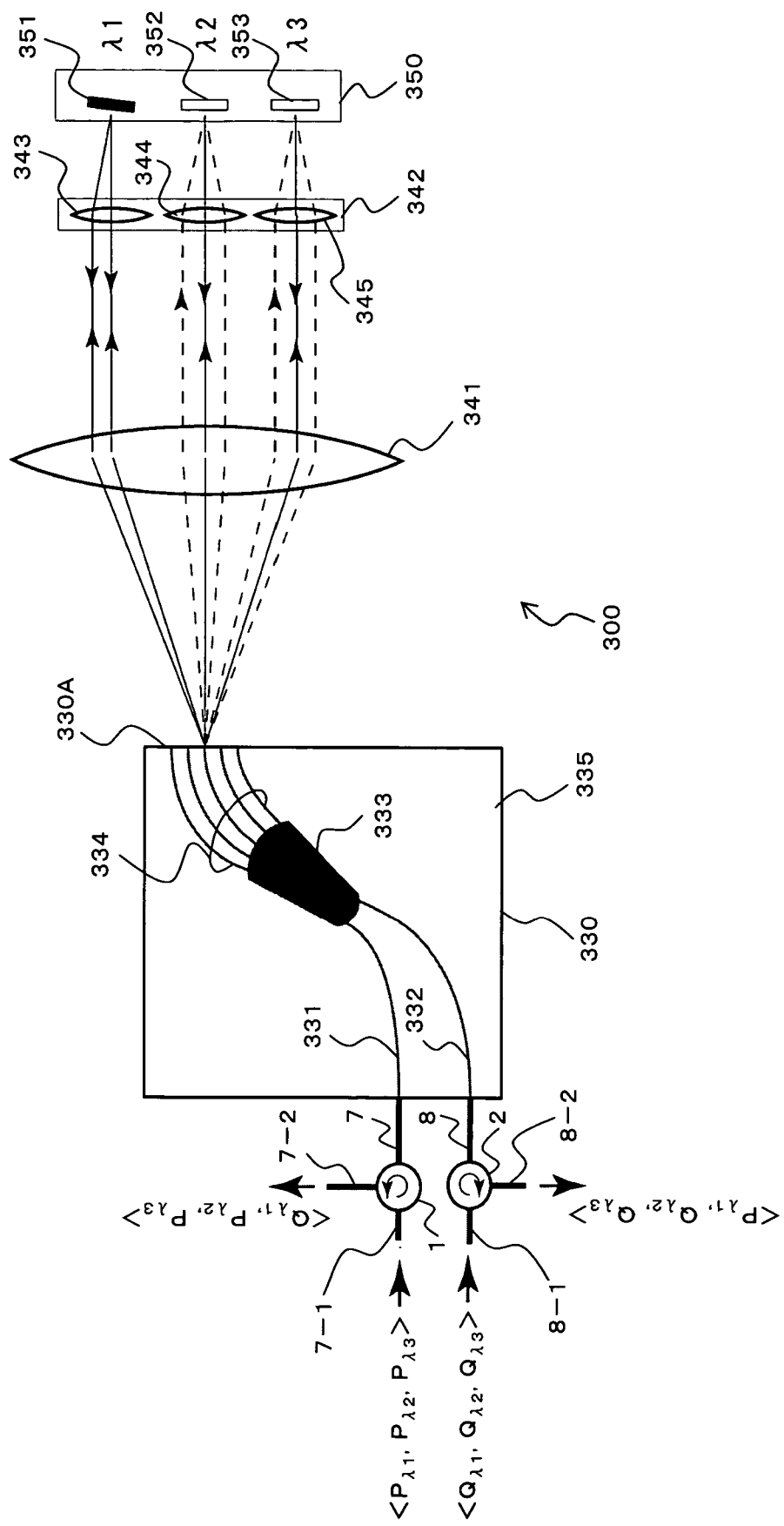
FIG. 5 is a schematic view showing a wavelength multiplexing processing apparatus according to a third embodiment of the present invention.

FIG. 5 is a schematic view showing a wavelength multiplexing processing apparatus according to a third embodiment of the present invention. Referring to FIG. 5, the wavelength multiplexing processing apparatus 300 includes an input/output optical interface section 9 which in turn includes optical circulators 1 and 2 and optical fibers 7, 7-1, 7-2 and 8, 8-1, 8-2, an AWG 330 as a waveguide device, a first lens 341 having a convex shape, a microlens array 342 and a mirror array 350, and performs a light drop and add process for wavelength multiplexed lights.

In particular, in the wavelength multiplexing processing apparatus 300 according to the third embodiment, one of a plurality of lights of different wavelength components which form wavelength multiplexed lights from the optical fiber 7-1 serving as an input port is selectively outputted (dropped) from the optical fiber 8-2 serving as a drop port. Further, a light from the optical fiber 8-1 serving as an add port is multiplexed (wavelength multiplexed) with (added to) the lights of the remaining wavelength components which form the wavelength multiplexed lights described above, and the resulting wavelength multiplexed lights are outputted from the optical fiber 7-2 serving as an output port.

The AWG 330 shown in FIG. 5 includes, similarly to that in the first embodiment described hereinabove, incoming/outgoing waveguides 331 and 332 to or from which optical signals are inputted or outputted, a (first) slab waveguide 333 and a plurality of channel waveguides 334 formed continuously and integrally on a substrate 335. In other words, the incoming/outgoing waveguides 331 and 332, the (first) slab waveguide 333 connected to the incoming/outgoing waveguides 331 and 332 and the plural channel waveguides 334 connected to the slab waveguide 333 and having lengths different from one another are formed on the substrate 335.

The channel waveguides 334 are vertically cut apart at a channel waveguide formation end face 330A such that the ends of the channel waveguides 334 are juxtaposed on a straight line. Consequently, the loss at the optical coupling between the channel waveguides 334 and the lens 341 is low.

The optical fiber 7-1 as an input port and the optical fiber 7-2 as an output port are connected to the incoming/outgoing waveguide 331 of the AWG 330 through the optical fiber 7 and the optical circulator 1 such that optical signals (wavelength multiplexed lights) from the optical fiber 7-1 as an input port are inputted to the incoming/outgoing waveguide 331 of the AWG 330 while optical signals (wavelength multiplexed lights) after a drop and/or add process are outputted toward the optical fiber 7-2 as a first output port.

Further, the optical fiber 8-1 as an add port and the optical fiber 8-2 as a drop port are connected to the incoming/outgoing waveguide 332 through the optical fiber 8 and the optical circulator 2 such that optical signals to be added are inputted from the optical fiber 8-1 while optical signals to be dropped are outputted to the optical fiber 8-2.

Also lights inputted from the incoming/outgoing waveguides 331 and 332 described above are diffused by the slab waveguide 333 and provided with phase differences corresponding to the waveguide lengths by the channel waveguides 334. The lights provided with the phase differences in this manner are outputted from the channel waveguide formation end face 330A of the substrate 335 toward the first lens 341. In other words, the slab waveguide 333 and the channel waveguides 334 cooperate with each other to spectralize wavelength multiplexed lights to different directions depending upon the wavelengths and the waveguide 331 or 332, to which the wavelength multiplexed lights are inputted, through diffraction and interference of the wave length multiplexed lights.

Further, in the AWG 330, lights inputted to the channel waveguide formation end face 330A from the lens 341 at the succeeding stage are outputted as wavelength multiplexed lights after a drop and/or add process from the incoming/outgoing waveguides 331 and 332 toward the optical fiber 7-2 as an output port and the optical fiber 8-2 serving as a drop port.

Similarly to the lens 4 in the first embodiment described hereinabove, the first lens (waveguide side lens) 341 is disposed at focal positions of optical signal components emitted from the plural channel waveguides 334. The first lens 341 condenses lights outputted from the channel waveguide formation end face 330A at focal positions different from one another depending upon different wavelengths and the waveguide 331 or 332, to which the wavelength multiplexed lights are inputted, and outputs the lights of the wavelengths as parallel lights having different optical paths from one another to the microlens array 342 side at the following stage. Further, the first lens 341 outputs reflected lights from the microlens array 342 at the following stage toward the channel waveguide formation end face 330A.

Accordingly, the channel waveguide formation end face 330A of the AWG 330 and the lens 341 are optically connected to each other in the incoming and outgoing directions, and the channel waveguide formation end face 330A and the lens 341 cooperatively have functions similar to those of the output side slab waveguide 705 described hereinabove with reference to FIGS. 10(a) and 10(b).

The microlens array 342 includes second lenses 343 to 345 as a plurality of reflecting mirror side lenses having a convex shape. The second lenses 343 to 345 are arranged on optical paths of lights of different wavelengths spectralized by the AWG 330 corresponding to the wavelengths which form input wavelength multiplexed lights. The lenses 343 to 345 in FIG. 5 are disposed on optical paths of lights of wavelengths $\lambda 1$ to $\lambda 3$ corresponding to the wavelengths $\lambda 1$ to $\lambda 3$, respectively.

In particular, the second lenses 343 to 345 condense lights $P\lambda 1$ to $P\lambda 3$ inputted from the optical fiber 7-1 as an input port and spectralized and lights $Q\lambda 1$ to $Q\lambda 3$ inputted from the optical fiber 8-1 as an add port and output the condensed lights to the mirror array 350. Further, the second lenses 343 to 345 output the lights of the different wavelengths reflected by the mirror array 350 as parallel lights to the first lens 341.

It is to be noted that the first lens 341 has a size sufficient to condense all of the spectralized signal lights with a single convex portion while the second lenses 343 to 345 have a size with which they can condense the spectralized lights of different wavelengths by means of convex portions of the different second lenses 343 to 345 individually for the lights of the different wavelengths.

The mirror array 350 which form a mirror array device includes a plurality of [three] reflecting mirrors 351 to 353 whose plane directions can be switched and which are arranged corresponding to the optical paths of inputted lights. The reflecting mirrors 351 to 353 individually reflect the parallel lights from the second lenses 343 to 345 so as to return to the second lenses 343 to 345, respectively.

In other words, the first lens 341 and the second lenses 343 to 345 function as a lens device which condenses, when wave length multiplexed optical signals are introduced into the plural incoming/outgoing waveguides 331 and 332, the optical signal components outputted from the plural channel waveguides 334 for the individual optical signal components having different optical paths and outputs the condensed optical signal components to the corresponding mirrors 351 to 353 of the mirror array 350, and then introduces the reflected lights from the mirrors 351 to 353 toward the end face 330A of the channel waveguides 334.

The plane direction angles of the mirrors 351 to 353 by which light signal components inputted to the incoming/outgoing waveguides 331 and 332 are reflected are set so that reflected lights originating from the input lights are outputted from one of the incoming/outgoing waveguides 331 and 332 through an optical drop and/or add process.

For example, in order to pass a light from the optical fiber 7-1 as an input port to the optical fiber 7-2 as an output port, that one of the mirrors 351 to 353 which reflects the pertaining wavelength light on the mirror array 350 is set to such a plane direction angle with which the reflecting mirror reflects the light in the completely opposite direction. In this instance, since the reflected light follows the original optical path to return to the AWG 330 and propagate in the incoming/outgoing waveguide 331, it is introduced through the optical circulator 1 to the optical fiber 7-2 serving as an output port.

On the other hand, in order to pass a light from the optical fiber 7-1 as an input port to the optical fiber 8-2 as a drop port, the plane direction angle of that one of the mirrors 351 to 353 which reflects the pertaining wavelength light on the mirror array 350 is switched so that the angle of the reflected light may be equal to the angle at which another light of the same wavelength inputted from the optical fiber 8-1 as an add port is outputted from the end face 330A.

In this instance, since the signal light returned to the AWG 330 is diffracted toward the incoming/outgoing waveguide 332, the reflected light is introduced through the optical circulator 2 to the optical fiber 8-2 serving as a drop port. At this time, since the light inputted to the optical fiber 8-1 as an add port is diffracted toward the incoming/outgoing waveguide 331, it is introduced through the optical circulator 1 to the optical fiber 7-2 serving as an output port. Accordingly, dropping switching from an input port to a drop port and adding switching from an add port to an output port can be achieved at a time.

It is to be noted that, in FIG. 5, the wavelength multiplexing processing apparatus 300 is shown in a state (routing state) wherein dropping switching [refer to $P\lambda 1$] of a light of the wavelength $\lambda 1$ from an input port to a drop port is performed and adding switching [refer to $Q\lambda 1$] of another light of the wavelength $\lambda 1$ from an add port to an output port is performed and also in a state [routing state] wherein switching of a light of the wavelength $\lambda 2$ and another light of the wavelength $\lambda 3$ from the input port to the output port is performed.

Operation of the wavelength multiplexing processing apparatus 300 according to the third embodiment of the present invention having the configuration described above is described in detail below.

In particular, wavelength multiplexed lights <$Q\lambda 1$, $Q\lambda 2$, $Q\lambda 3$> [in the following description, optical signal components which compose wavelength multiplexed lights are indicated in <>] from the optical fiber 7-1 are inputted to the incoming/outgoing waveguide 331 which composes the AWG 330 through the optical circulator 1 and the optical fiber 7 while a wavelength multiplexed light $P\lambda 1$ from the optical fiber 8-1 is inputted to the incoming/outgoing waveguide 332 of the AWG 330 through the optical circulator 2 and the optical fiber 8 so as to undergo an optical cross connect process.

The wavelength multiplexing processing apparatus 300 which is composed of the input/output optical interface section 9, AWG 330, first lens 341, microlens array 342 and mirror array 350 performs a drop and add process for two sets of wavelength multiplexed lights inputted to the incoming/outgoing waveguides 331 and 332 as described above, and outputs, for example, resulting wavelength multiplexed lights <$Q\lambda 1$, $P\lambda 2$, $P\lambda 3$> through the incoming/outgoing waveguide 331 and outputs a drop light $P\lambda 1$ through the incoming/outgoing waveguide 332.

It is to be noted that, while the mirror array 350 reflects signal lights of wavelength components demultiplexed into individual wavelengths and selectively switches the mirror angles for a light drop and add process in accordance with the individual wavelengths, it is also possible to adjust the angles of the reflecting mirrors 351 to 353 so as to return the reflected lights to the AWG 330 with the light intensities of the reflected lights attenuated suitably. Where the arrangement just described is employed, a wavelength multiplexing processing apparatus can be configured which has not only a function as an optical drop and add apparatus but also another function for varying the light transmission intensity for each wavelength.

In this manner, with the wavelength multiplexing processing apparatus according to the third embodiment of the present invention, since an optical drop and add function can be implemented using a single AWG 330, there is an advantage that the number of parts for composing the apparatus can be reduced to reduce the production cost significantly and achieve miniaturization of the apparatus scale.

Further, the wavelength multiplexing processing apparatus is advantageous also in that, since it can be constructed using only one mirror array 350, the number of parts for constructing the apparatus can be reduced to reduce the production cost significantly, and also the plane direction angle switching control for the reflecting mirrors 351 to 353 which compose the mirror array 350 can be facilitated.

[E] Fourth Embodiment

Figure 6:
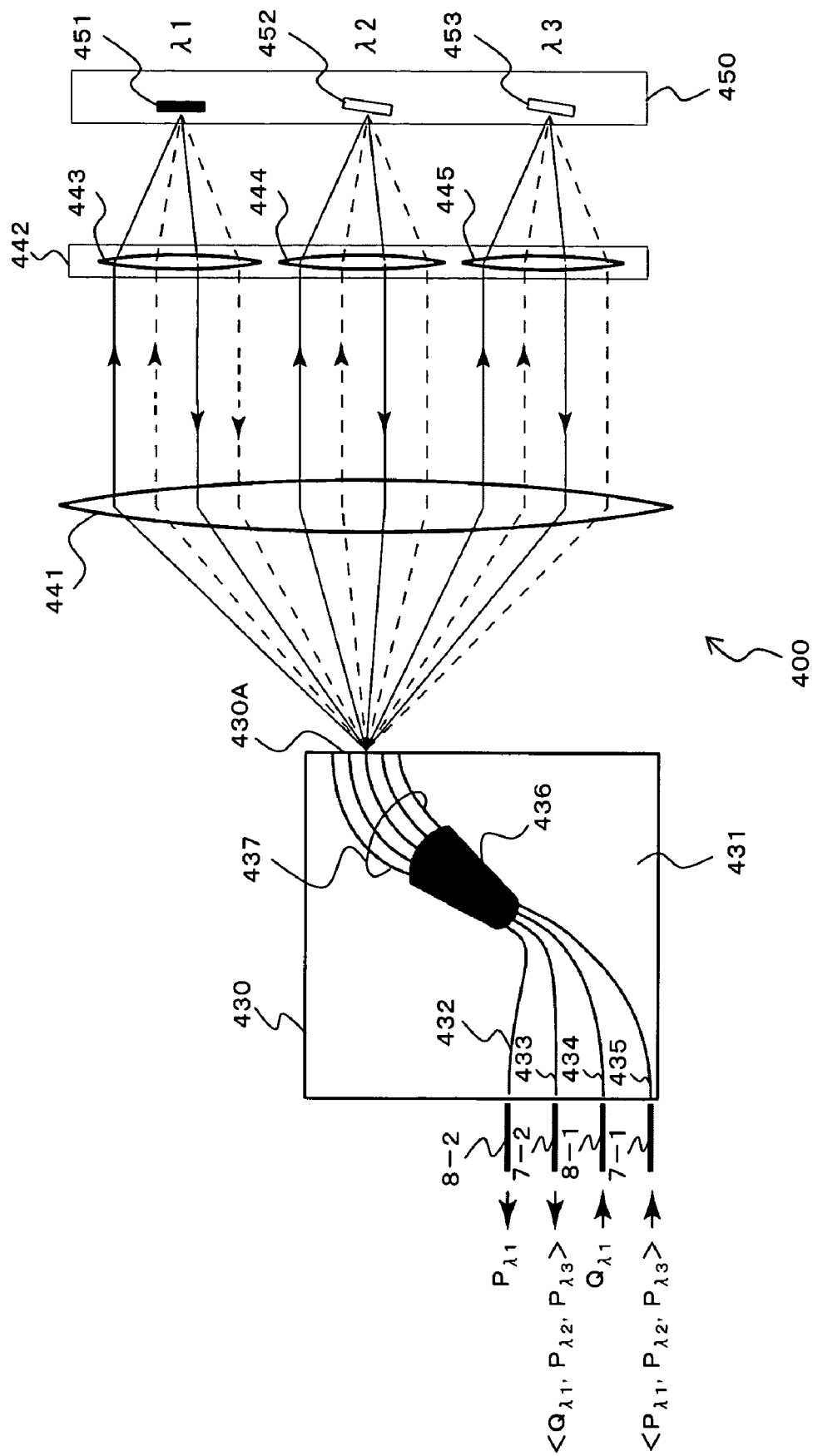
FIG. 6 is a schematic view showing a wavelength multiplexing processing apparatus according to a fourth embodiment of the present invention.
Figure 7A:
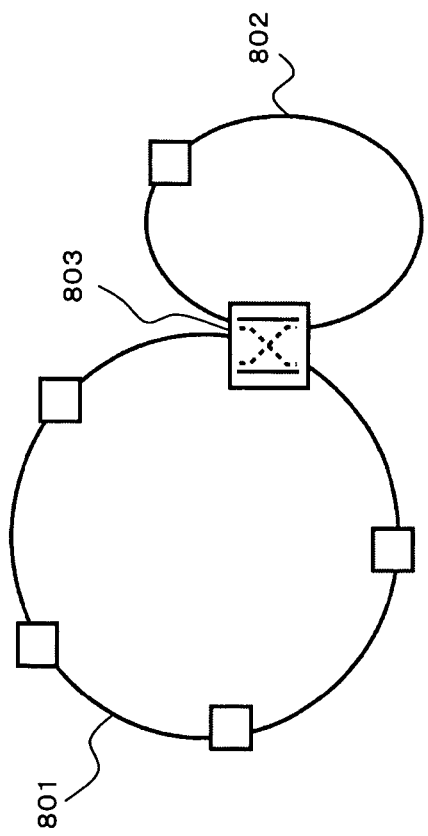
FIGS. 7(*a*) and 7(*b*) are diagrammatic views showing an example of a network configuration of a WDM transmission system.
Figure 7B:
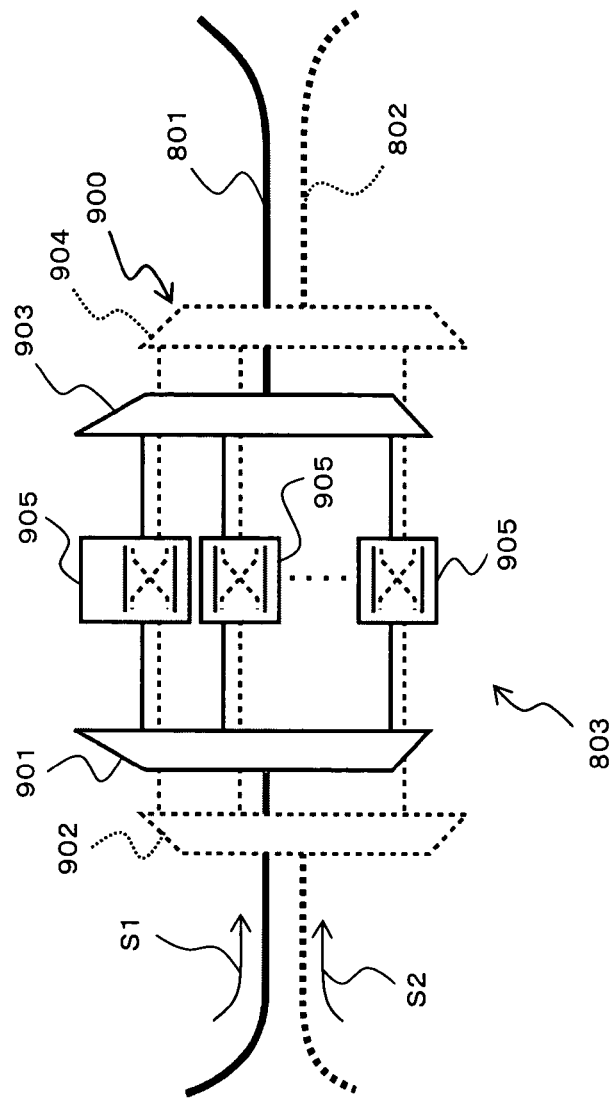
Figure 9:
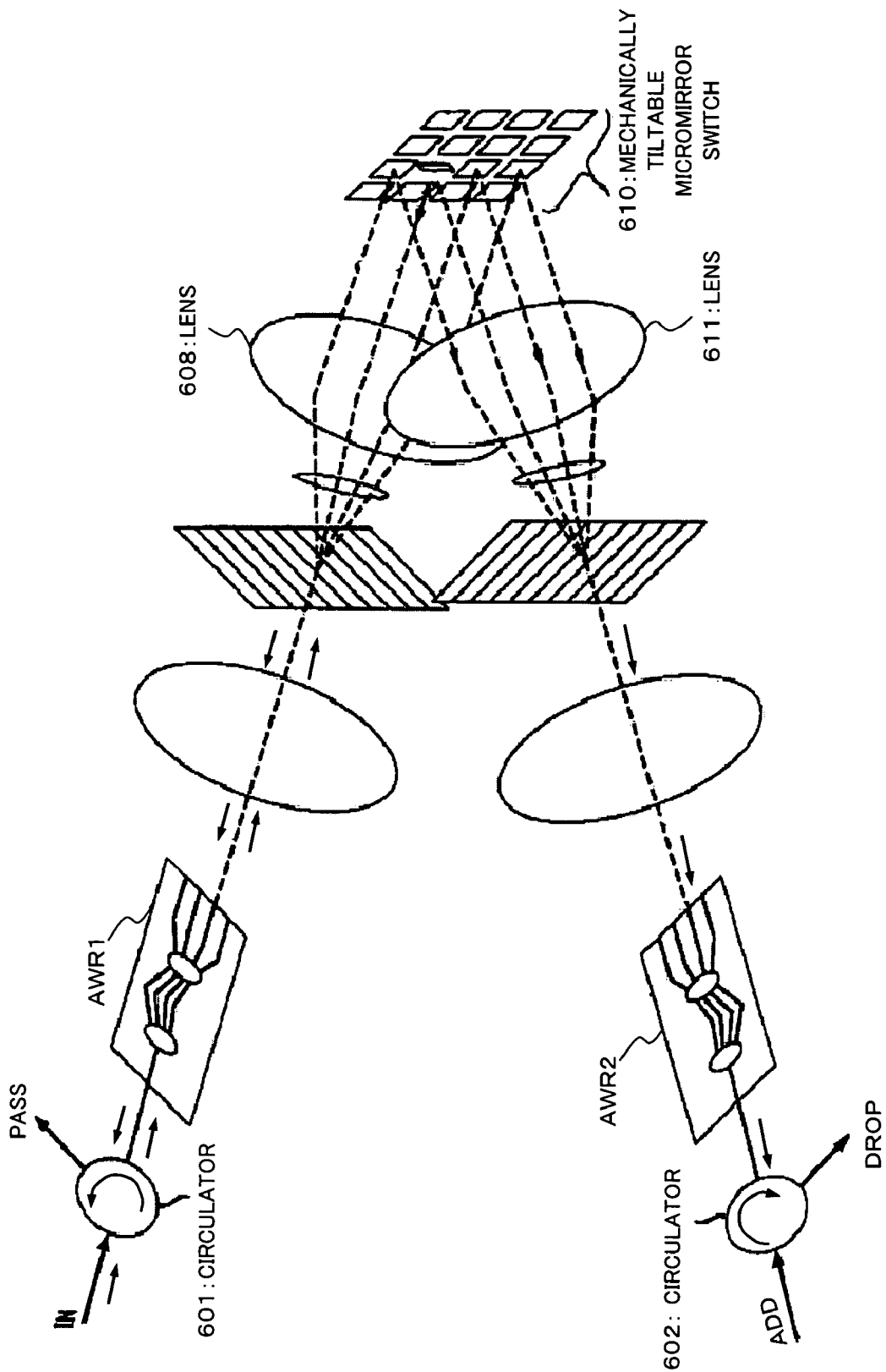
FIG. 9 is a schematic view showing a conventional cross connect apparatus or add/drop apparatus.

FIG. 6 is a schematic view showing a wavelength multiplexing processing apparatus according to a fourth embodiment of the present invention. Referring to FIG. 6, the wave length multiplexing processing apparatus 400 shown is common to the wavelength multiplexing processing apparatus 300 of the third embodiment described above in that it has a cross connect function and a light transmission intensity variation function for each wavelength. However, the wavelength multiplexing processing apparatus 400 is different from the wavelength multiplexing processing apparatus 300 in configuration of an AWG 430 and is further different in that it eliminates the optical circulators 1 and 2 and the optical fibers 7 and 8 for interconnecting the optical fibers 7-1, 7-2 and 8-1, 8-2 as input/output ports and the AWG 430.

The AWG 430 has a configuration similar to that of the AWG 230 in the second embodiment described hereinabove and is equivalent to a device produced by cutting the substrate 701 of the AWG 700 [refer to FIGS. 10(a) and 10(b)] described hereinabove such that the channel waveguides 704 are cut apart vertically along an end face of the substrate 701.

In particular, incoming/outgoing waveguides 432 to 435 to or from which optical signals are inputted or outputted, a (first) slab waveguide 436 connected to the incoming/outgoing waveguides 432 to 435 and a plurality of channel waveguides 437 connected to the slab waveguide 436 and having lengths different from one another are formed on the substrate 431. Further, the channel waveguides 437 are vertically cut apart at the channel waveguide formation end face 430A such that the ends of the plural channel waveguides 437 are juxtaposed on a straight line. Consequently, the loss at the optical coupling between the channel waveguides 437 and the lens 4 is low.

While the AWG 430 includes the four incoming/outgoing waveguides 432 to 435, the slab waveguide 436 and the channel waveguides 437 are functionally configured similarly to the slab waveguide 33 and the channel waveguides 34 of the AWGs 3, 3-1 and 3-2, respectively. Further, the four incoming/outgoing waveguides 432 to 435 of the AWG 430 are connected to optical fibers 8-2, 7-2, 8-1 and 7-1, respectively.

Consequently, the incoming/outgoing waveguide 432 is formed as an outgoing waveguide from which a light to be dropped is outputted to the optical fiber 8-2 serving as a drop port (second output port), and the incoming/outgoing waveguide 433 is formed as an outgoing waveguide from which wavelength multiplexed lights after an optical drop and add process are outputted to the optical fiber 7-2 serving as a (first) output port. Similarly, the incoming/outgoing waveguide 434 is formed as an incoming waveguide to which a light to be added is inputted from the optical fiber 8-1 serving as an add port (second input port), and the incoming/outgoing waveguide 435 is formed as an incoming waveguide to which wavelength multiplexed lights are inputted from the optical fiber 7-1 serving as a (first) input port.

Accordingly, the incoming/outgoing waveguide 432 is formed as a fourth waveguide connected to the second output port and the incoming/outgoing waveguide 433 is formed as a third waveguide connected to the first output port while the incoming/outgoing waveguide 434 is formed as a second waveguide connected to the second input port and the incoming/outgoing waveguide 435 is formed as a first waveguide connected to the first input port. The four incoming/outgoing waveguides 432 to 435 are arranged relatively in order of the first input/output waveguide, second input/output waveguide, third input/output waveguide and fourth input/output waveguide.

Also lights inputted from the incoming/outgoing waveguides 434 and 435 described above are diffused by the slab waveguide 436 and provided with phase differences corresponding to the waveguide lengths by the channel waveguides 437. The lights provided with the phase differences in this manner are outputted from the channel waveguide formation end face 430A of the substrate 431 toward the first lens 441. In other words, the slab waveguide 436 and the channel waveguides 437 cooperate with each other to spectralize wavelength multiplexed lights to different directions depending upon the wavelengths and the waveguide 434 or 435, to which the wavelength multiplexed lights are inputted, through diffraction and interference of the wavelength multiplexed lights.

Further, in the AWG 430, lights inputted to the channel waveguide formation end face 430A from the first lens 441 are outputted as wavelength multiplexed lights after a drop and/or add process from the incoming/outgoing waveguides 433 and 432 toward the optical fiber 7-2 as an output port and the optical fiber 8-2 serving as a drop port.

Similarly to the lens 341 in the third embodiment described hereinabove, the first lens 441 is disposed at focal positions of optical signal components outputted from the plural channel waveguides 437. The first lens 441 condenses lights outputted from the channel waveguide formation end face 430A at focal positions different from one another depending upon different wavelengths and the waveguide 434 or 435, to which the wavelength multiplexed lights are inputted, and outputs the lights of the wavelengths as parallel lights having different optical paths from one another to the microlens array 442 side at the following stage. Further, the first lens 441 condenses and outputs reflected lights from the microlens array 442 at the following stage toward the channel waveguide formation end face 430A.

Accordingly, the channel waveguide formation end face 430A of the AWG 430 and the lens 441 are optically connected to each other in the incoming and outgoing directions, and the channel waveguide formation end face 430A and the lens 441 cooperatively have functions similar to those of the output side slab waveguide 705 described hereinabove with reference to FIGS. 10(a) and 10(b).

The microlens array 442 includes second lenses 443 to 445 as a plurality of reflecting mirror side lenses having a convex shape. The second lenses 443 to 445 are arranged on optical paths of lights of different wavelengths spectralized by the AWG 430 corresponding to the wavelengths which form input wavelength multiplexed lights. The lenses 443 to 445 in FIG. 6 are disposed on optical paths of lights of wavelengths $\lambda 1$ to $\lambda 3$ corresponding to the wavelengths $\lambda 1$ to $\lambda 3$, respectively.

In particular, the second lenses 443 to 445 condense lights $P\lambda 1$ to $P\lambda 3$ inputted from the optical fiber 7-1 as an input port and spectralized and lights $Q\lambda 1$ to $Q\lambda 3$ inputted from the optical fiber 8-1 as an add port and output the condensed lights to the mirror array 450. Further, the second lenses 443 to 445 output the lights of the different wavelengths reflected by the mirror array 450 as parallel lights to the first lens 441.

It is to be noted that the first lens 441 has a size sufficient to condense all of the spectralized signal lights with a single convex portion while the second lenses 443 to 445 have a size with which they can condense the spectralized lights of different wavelengths by means of convex portions of the different second lenses 443 to 445 individually for the lights of the different wavelengths.

The mirror array 450 which form a mirror array device includes a plurality of [three] reflecting mirrors 451 to 453 whose plane directions can be switched and which are arranged corresponding to the optical paths of inputted lights. The reflecting mirrors 451 to 453 individually reflect the parallel lights from the second lenses 443 to 445 so as to return to the second lenses 443 to 445, respectively.

In other words, the first lens 441 and the second lenses 443 to 445 described above function as a lens device which condenses, when lights are introduced into the incoming/outgoing waveguides 435 and 434, the optical signal components outputted from the plural channel waveguides 437 for the individual optical signal components having different optical paths and outputs the condensed optical signal components to the corresponding mirrors 451 to 453 of the mirror array 450, and then introduces the reflected lights from the mirrors 451 to 453 toward the end face 430A of the channel waveguides 437.

The plane direction angles of the mirrors 451 to 453 by which light signal components inputted to the incoming/outgoing waveguides 435 and 434 are reflected are set so that reflected lights originating from the input lights are outputted from one of the incoming/outgoing waveguides 432 and 433 through an optical drop and/or add process.

For example, in order to pass a light from the optical fiber 7-1 as an input port to the optical fiber 7-2 as an output port, the plane direction angle of that one of the mirrors 451 to 453 which reflects the pertaining wavelength light on the mirror array 450 is switched so that the reflected light of the wavelength is propagated in the incoming/outgoing waveguide 433. Consequently, the wavelength light is introduced to the optical fiber 7-2 as a drop port.

On the other hand, in order to pass a light from the optical fiber 7-1 as an input port to the optical fiber 8-2 as a drop port, the plane direction angle of that one of the mirrors 451 to 453 which reflects the pertaining wavelength light on the mirror array 450 is switched so that the reflected light of the wavelength is propagated in the incoming/outgoing waveguide 432. Consequently, the wavelength light is introduced to the optical fiber 8-2 as a drop port.

At this time, when the light inputted to the optical fiber 8-1 as an add port arrives at the mirror array 450 through the AWG 430, first lens 441 and microlens array 442, it is reflected so as to pass such an optical path along which it is to propagate in the incoming/outgoing waveguide 433. Consequently, the light is introduced to the optical fiber 7-2 serving as an output port. Accordingly, dropping switch from the input port to the drop port and adding switching from the add port to the output port can be implemented simultaneously.

It is to be noted that, in FIG. 6, the wavelength multiplexing processing apparatus 400 is in a state (routing state) wherein dropping switching [refer to $P\lambda 1$] of a light of the wavelength $\lambda 1$ from an input port to a drop port is performed and adding switching [refer to $Q\lambda 1$] of another light of the wavelength $\lambda 1$ from an add port to an output port is performed and also in a state [routing state] wherein switching of a light of the wavelength $\lambda 2$ and another light of the wavelength $\lambda 3$ from the input port to the output port is performed.

An example of operation of the wavelength multiplexing processing apparatus 400 according to the third embodiment of the present invention having the configuration described above is described in detail below.

In particular, wavelength multiplexed lights <$P\lambda 1$, $P\lambda 2$, $P\lambda 3$> [in the following description, optical signal components which compose wavelength multiplexed lights are indicated in <>] from the optical fiber 7-1 are inputted to the incoming/outgoing waveguide 435 which composes the AWG 430 while a light $Q\lambda 1$ for add switching from the optical fiber 8-1 is inputted to the incoming/outgoing waveguide 434 of the AWG 430 so as to undergo an optical drop process.

The wavelength multiplexing processing apparatus 400 performs a drop and add process for lights inputted to the incoming/outgoing waveguides 435 and 434 as described above through plane angle switching of the mirrors 451 to 453, and outputs, for example, resulting wavelength multiplexed lights <$Q\lambda 1$, $P\lambda 2$, $P\lambda 3$> through the incoming/outgoing waveguide 433 and outputs a drop light $P\lambda 1$ through the incoming/outgoing waveguide 432.

It is to be noted that, while the mirror array 450 reflects signal lights of wavelength components demultiplexed into individual wavelengths and selectively switches the mirror angles for a light drop and add process in accordance with the individual wavelengths, it is also possible to adjust the angles of the reflecting mirrors 451 to 453 so as to return the reflected lights to the AWG 430 with the light intensities of the reflected lights attenuated suitably. Where the arrangement just described is employed, a wavelength multiplexing processing apparatus can be configured which has not only a function as an optical drop and add apparatus but also another function for varying the light transmission intensity for each wavelength.

In this manner, with the wavelength multiplexing processing apparatus according to the fourth embodiment of the present invention, since an optical drop and add function can be implemented using a single AWG 430, there is an advantage that the number of parts for composing the apparatus can be reduced to reduce the production cost significantly and achieve miniaturization of the apparatus scale.

Further, the wavelength multiplexing processing apparatus is advantageous also in that, since it can be constructed using only one mirror array 450, the number of parts for constructing the apparatus can be reduced to reduce the production cost significantly, and also the plane direction angle switching control for the reflecting mirrors 451 to 453 which compose the mirror array 450 can be facilitated.

Further, since the AWG 430 is used, optical circulators which are required by the wavelength multiplexing processing apparatus of the third embodiment can be eliminated. Therefore, it is possible to further reduce the number of parts thereby to achieve further reduction in production cost and apparatus scale and also possible to reduce the optical loss by an amount exhibited when light passes through the optical circulators.

[F] Others

In the foregoing description of the wavelength multiplexing apparatus of the embodiments, it is described particularly that the number of wavelengths of wavelength multiplexed lights to be inputted is 3. However, according to the present invention, the number of such wavelengths is not limited to the specific number, but naturally it is possible to receive four or more wavelength multiplexed lights of different wavelengths and perform an optical cross connect process or an optical add or drop process for the wavelength multiplexed lights.

Further, in the embodiments described above, the number of input ports and the number of output ports are 2. However, according to the present invention, the numbers of them are not limited to the specific number, but it is possible to use more than two input ports and more than two outputs.

Furthermore, in the second to fourth embodiments described above, an AWG on which no second slab waveguide is formed is used for the AWGs 230, 330 and 430. However, according to the present invention, the AWG is not limited to the specific AWG, and also it is possible to use an AWG on which a second slab waveguide such as the output side slab waveguide 35 or 36 in the AWG 3-1 or 3-2 in the first modification or the second modification to the first embodiment is formed. Where an AWG of the type just described is used, advantages similar to those achieved by the first modification or the second modification to the first embodiment can be anticipated.

Further, the present invention is not limited to the embodiments specifically described above, and variations and modifications can be made without departing from the scope of the present invention.

Furthermore, the apparatus of the invention of the present application can be produced based on the embodiments described hereinabove.

What is claimed is:

1. A wavelength multiplexing processing apparatus, comprising:
a waveguide device including a substrate, a plurality of incoming and outgoing waveguides formed on said substrate each for allowing an optical signal to come in or go out therethrough, a first slab waveguide formed on said substrate and connected to said plural incoming and outgoing waveguides, and a set of a plurality of channel waveguides of different lengths from each other formed on said substrate and connected to said first slab waveguide;
a mirror array device including at least one mirror array wherein a reflecting mirror whose angle in a plane direction can be changed is disposed corresponding to each of the optical signals; and
a lens device for condensing, when a wavelength-multiplexed optical signal is introduced into said plural incoming and outgoing waveguides, optical signal components outgoing from said set of waveguides for the individual optical signal components having different light paths so that the condensed optical signal components go out to the corresponding reflecting mirrors of said mirror array device and for introducing reflected light from the reflecting mirrors to an end face of said substrate adjacent said channel waveguides;
the plane direction angles of the reflecting mirrors which reflect the incoming optical signal components being set so that reflected light of an optical signal component incoming from one of said plural incoming and outgoing waveguides may go out from one of said plural incoming and outgoing waveguides through said set of waveguides and said first slab waveguide.

2. The wavelength multiplexing processing apparatus as claimed in claim 1, wherein said mirror array device includes a plurality of mirror arrays and the respective mirrors of said plural mirror arrays cooperate to set the plane direction angles so that reflected light of an optical signal component incoming from one of said plural incoming and outgoing waveguides may go out from one of said plural incoming and outgoing waveguides, and said lens device includes a waveguide side lens disposed at a focal position of the optical signal components going out from said plural channel waveguides.

3. The wavelength multiplexing processing apparatus as claimed in claim 1, wherein said mirror array device includes a single mirror array, and said lens device includes a waveguide side lens disposed at a focal position of the optical signal components going out from said plural channel waveguides and a lens array including a plurality of reflecting mirror side lenses disposed in a corresponding relationship to the reflecting mirrors of said mirror array.

4. The wavelength multiplexing processing apparatus as claimed in claim 1, wherein the plane direction angles of the reflecting mirrors by which the incoming optical signal components are reflected are set so as to perform a cross connection process of the optical signal components incoming from said plural incoming and outgoing waveguides.

5. The wavelength multiplexing processing apparatus as claimed in claim 1, wherein the plane direction angles of the reflecting mirrors by which the incoming optical signal components are reflected are set so as to perform a light branching and inserting process of a light signal component incoming from one of said plural incoming and outgoing waveguides through one of the waveguides other than the waveguide from which the optical signal component comes in.

6. The wavelength multiplexing processing apparatus as claimed in claim 1, wherein said waveguide device further includes a second slab waveguide formed on said substrate and connected to said plural channel waveguides, and said second slab waveguide is formed on said end face of said substrate adjacent said channel waveguides into which the reflected light from the reflecting mirrors comes.

7. The wavelength multiplexing processing apparatus as claimed in claim 6, wherein said second slab waveguide has a length smaller than that of said first slab waveguide.

8. The wavelength multiplexing processing apparatus as claimed in claim 1, wherein said plural channel waveguides have ends disposed on a straight line.

9. The wavelength multiplexing processing apparatus as claimed in claim 1, wherein said plural incoming and outgoing waveguides formed on said substrate of said waveguide device include a first incoming and outgoing waveguide and a second incoming and outgoing waveguide, and a first input port and a first output are connected to said first incoming and outgoing waveguide through a first optical circulator while a second input port and a second output port are connected to said second incoming and outgoing waveguide through a second optical circulator.

10. The wavelength multiplexing processing apparatus as claimed in claim 1, wherein said plural incoming and outgoing waveguides formed on said substrate of said waveguide device include first and second incoming and outgoing waveguides into which the optical signals come and third and fourth incoming and outgoing waveguides from which the optical signals go out, and a first input port is connected to said first incoming and outgoing waveguide and a second input port is connected to said second incoming and outgoing waveguide and a second output port is connected to said fourth incoming and outgoing waveguide.

11. The wavelength multiplexing processing apparatus as claimed in claim 10, wherein the four first to fourth incoming and outgoing waveguides are arranged in order of said first incoming and outgoing waveguide, second incoming and outgoing waveguide, third incoming and outgoing waveguide and fourth incoming and outgoing waveguide relative to one another.

12. The wavelength multiplexing processing apparatus as claimed in claim 9, wherein said first input port serves as an input port for a light inserting and branching process and said second input port serves as an insertion port for the light inserting and branching process while said first output serves as an output port for the light inserting and branching process and said second output port serves as a branching port for the light inserting and branching process.

13. The wavelength multiplexing processing apparatus as claimed in claim 10, wherein said first input port serves as an input port for a light inserting and branching process and said second input port serves as an insertion port for the light inserting and branching process while said first output serves as an output port for the light inserting and branching process and said second output port serves as a branching port for the light inserting and branching process.

14. The wavelength multiplexing processing apparatus as claimed in claim 11, wherein said first input port serves as an input port for a light inserting and branching process and said second input port serves as an insertion port for the light inserting and branching process while said first output serves as an output port for the light inserting and branching process and said second output port serves as a branching port for the light inserting and branching process.

15. The wavelength multiplexing processing apparatus as claimed in claim 1, wherein said mirror array device includes a first mirror array and a second mirror array, and said first mirror array is optically connected to said lens device and is disposed such that an optical axis there of to said second mirror array is directed so as not to overlap at least with optical axes of said plural channel waveguides while said second mirror array is disposed so as to reflect incoming light from said first mirror array back to said first mirror array.

16. A method for wavelength multiplexing processing, comprising:

allowing a plurality of optical signals to come in through a plurality incoming and outgoing waveguides formed on a substrate, a slab waveguide formed on said substrate, and a plurality of channel waveguides of different lengths from each other formed on said substrate;

condensing each of said plurality of optical signals at a corresponding reflecting mirror of a mirror array device;

reflecting each of said plurality of optical signals at a corresponding one of said plurality channel waveguides; and allowing said optical signal to go out through said plurality of channel waveguides of different lengths from each other, said slab waveguide, and said plurality of incoming and outgoing waveguides.

* * * * *

UNITED STATES PATENT AND TRADEMARK OFFICE
CERTIFICATE OF CORRECTION

PATENT NO. : 7,079,728 B2 Page 1 of 1
APPLICATION NO. : 10/747292
DATED : July 18, 2006
INVENTOR(S) : Goji Nakagawa et al.

It is certified that error appears in the above-identified patent and that said Letters Patent is hereby corrected as shown below:

Col. 28, line 61, after "waveguide" insert --while a first output port is connected to said third incoming and outgoing waveguide--.

Signed and Sealed this

Nineteenth Day of December, 2006

JON W. DUDAS
*Director of the United States Patent and Trademark Office*